United States Patent
Al-Stouhi et al.

(10) Patent No.: US 10,334,331 B2
(45) Date of Patent: Jun. 25, 2019

(54) SYSTEM AND METHOD FOR SYNCHRONIZED VEHICLE SENSOR DATA ACQUISITION PROCESSING USING VEHICULAR COMMUNICATION

(71) Applicant: Honda Motor Co., Ltd., Tokyo (JP)

(72) Inventors: Samir K. Al-Stouhi, Dearborn, MI (US); Paritosh Kelkar, Dearborn, MI (US); Hasan Tafish, Farmington Hills, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/686,250

(22) Filed: Aug. 25, 2017

(65) Prior Publication Data

US 2019/0069051 A1 Feb. 28, 2019

(51) Int. Cl.
*H04Q 9/00* (2006.01)
*G07C 5/00* (2006.01)

(52) U.S. Cl.
CPC .............. *H04Q 9/00* (2013.01); *G07C 5/008* (2013.01); *H04Q 2209/40* (2013.01); *H04Q 2209/845* (2013.01)

(58) Field of Classification Search
CPC ....................................................... H04Q 9/00
USPC .................................................... 340/870.07
See application file for complete search history.

(56) References Cited

U.S. PATENT DOCUMENTS

| | | | |
|---|---|---|---|
| 6,487,500 B2 | 11/2002 | Lemelson et al. | |
| 6,552,342 B2 | 4/2003 | Holz et al. | |
| 7,164,118 B2 | 1/2007 | Anderson et al. | |
| 7,280,674 B2 | 10/2007 | Matveev | |
| 7,444,240 B2 | 10/2008 | Macneille et al. | |
| 7,994,902 B2 | 8/2011 | Avery et al. | |
| 8,229,663 B2 | 7/2012 | Zeng et al. | |
| 8,812,226 B2 | 8/2014 | Zeng | |
| 8,983,771 B2 | 3/2015 | Breed | |
| 9,117,371 B2 | 8/2015 | Hutchings | |
| 9,300,423 B2 | 3/2016 | Rubin et al. | |

(Continued)

FOREIGN PATENT DOCUMENTS

WO 2004031877 4/2004

OTHER PUBLICATIONS

Notice of Allowance of U.S. Appl. No. 15/851,566 dated Sep. 6, 2018, 18 pages.

(Continued)

*Primary Examiner* — Qutbuddin Ghulamali
(74) *Attorney, Agent, or Firm* — Rankin, Hill & Clark LLP

(57) ABSTRACT

A method and system for controlling vehicle sensor data acquisition using a vehicular communication network, including synchronizing a local clock signal of a first vehicle and a local clock signal of a second vehicle with a global time signal. Further, determining a capture interval for a sensor data acquisition process time that maximizes a total number of data frames that can be captured by a sensor of the first vehicle and by a sensor of the second vehicle. Based on the capture interval, transmitting a first sensor trigger pulse to the sensor of the first vehicle and transmitting a second sensor trigger pulse according to the sensor of the second vehicle. The first vehicle transmits the sensor data from the sensor of the first vehicle to the second vehicle, and the second vehicle transmits the sensor data from the sensor of the second vehicle to the first vehicle.

20 Claims, 11 Drawing Sheets

(56) References Cited

U.S. PATENT DOCUMENTS

| | | |
|---|---|---|
| 9,472,097 B2 | 10/2016 | Stelzig et al. |
| 9,563,808 B2 | 2/2017 | Zeng et al. |
| 10,168,418 B1 | 1/2019 | Al-Stouhi et al. |
| 2003/0102997 A1 | 6/2003 | Levin et al. |
| 2006/0164292 A1 | 7/2006 | Buechler et al. |
| 2008/0040004 A1 | 2/2008 | Breed |
| 2008/0161986 A1 | 7/2008 | Breed |
| 2015/0254781 A1 | 9/2015 | Binion et al. |
| 2015/0358481 A1* | 12/2015 | Nagata .................. H04W 4/04 370/259 |
| 2016/0054441 A1 | 2/2016 | Kuo et al. |
| 2016/0086032 A1* | 3/2016 | Pickett .................. G06F 17/40 382/110 |
| 2016/0205656 A1* | 7/2016 | Zeng .................. H04W 4/046 455/456.1 |
| 2016/0223643 A1 | 8/2016 | Li et al. |
| 2016/0349365 A1 | 12/2016 | Ling |
| 2017/0017734 A1 | 1/2017 | Groh et al. |
| 2017/0043771 A1 | 2/2017 | Ibanez-guzman et al. |
| 2017/0082737 A1* | 3/2017 | Slobodyanyuk ........ G01S 7/497 |
| 2017/0094248 A1 | 3/2017 | Kashyap |
| 2017/0243485 A1 | 8/2017 | Rubin et al. |
| 2017/0278398 A1* | 9/2017 | Kato .................. G08G 1/166 |

OTHER PUBLICATIONS

An Adaptive TDMA Slot Assignment Strategy in Vehicular Ad Hoc Networks http://www.riverpublishers.com/journal_read_html_article.php?j=JMMC/1/2/6, printed Dec. 21, 2017.

OfficOffice Action of U.S. Appl. No. 16/177,366 dated Jan. 28, 2019, 14 pages.

Office Action of U.S. Appl. No. 15/686,262 dated Feb. 21, 2019, 71 pages.

* cited by examiner

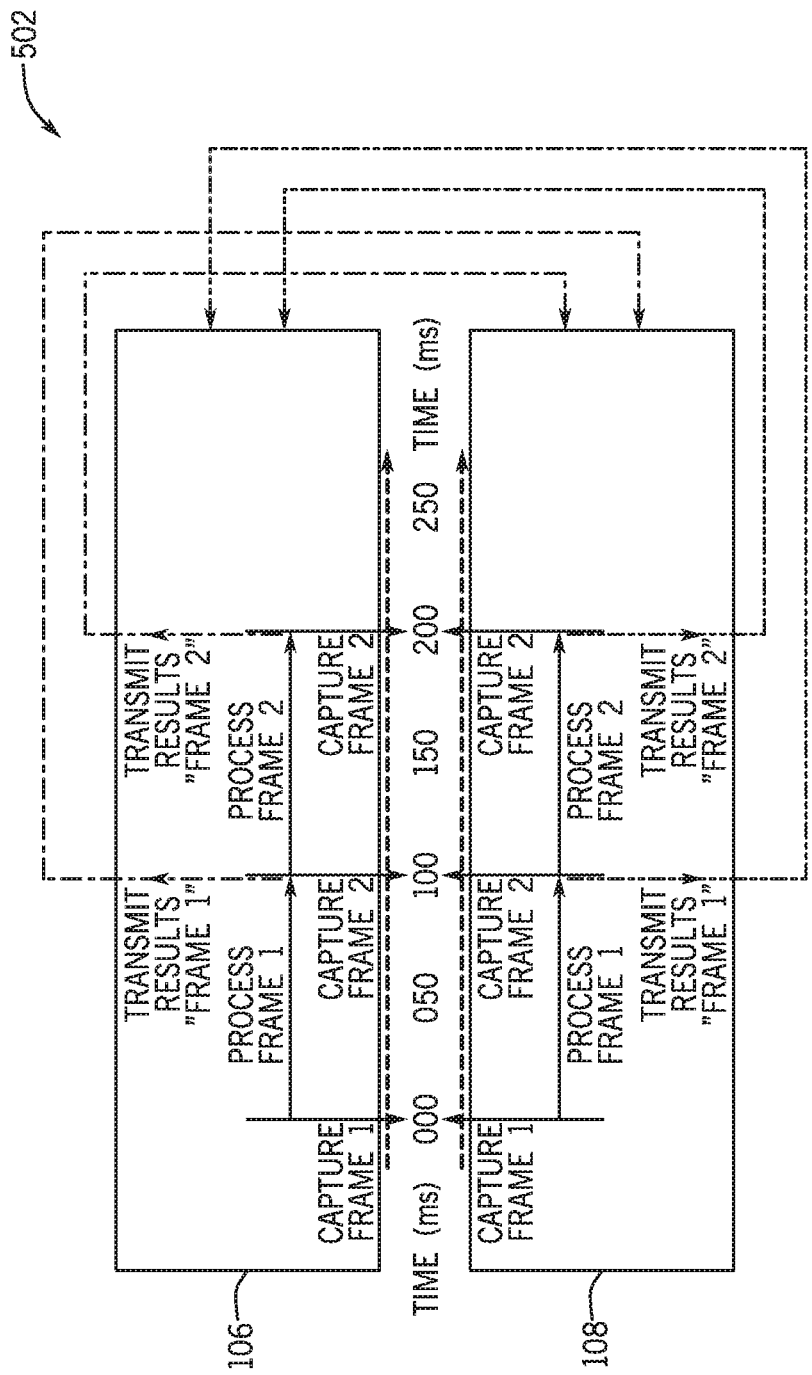

SYSTEM AND METHOD FOR SYNCHRONIZED VEHICLE SENSOR DATA ACQUISITION PROCESSING USING VEHICULAR COMMUNICATION

BACKGROUND

Automotive manufacturers are continuously increasing the use of electronic systems, including sensors and automated sensing technologies, to improve safety applications and vehicle performance. For example, sensors can be used to measure data about the surroundings of a vehicle, which in turn can be used to control or automate driving functions. Thus, sensors, and the actuators that control the sensors, must be accurate and reliable to provide optimal vehicle performance.

In addition to the increasing use of sensors, many vehicles are configured for information exchange using wireless vehicle communication, for example, Vehicle-to-Vehicle (V2V), Vehicle-to-Infrastructure (V2I), and Vehicle-to-Everything (V2X) communication. Vehicles can use wireless vehicle communication to share sensor data. However, to share sensor data in a useful and reliable manner using wireless vehicle communication, vehicles must work cooperatively to acquire and transmit sensor data.

BRIEF DESCRIPTION

According to one aspect, a computer-implemented method for controlling vehicle sensor data acquisition using a vehicular communication network includes, establishing an operable connection for computer communication between a first vehicle and a second vehicle using the vehicular communication network. The method includes receiving a global time signal at the first vehicle and at the second vehicle. A processor of the first vehicle synchronizes a local clock signal of the first vehicle with the global time signal, and A processor of the second vehicle synchronizes a local clock signal of the second vehicle with the global time signal. Further, the method includes determining a capture interval for a sensor data acquisition process time that maximizes a total number of data frames that can be captured by a sensor of the first vehicle and by a sensor of the second vehicle. The method includes transmitting a first sensor trigger pulse according to the capture interval to the sensor of the first vehicle thereby triggering acquisition of sensor data from the sensor of the first vehicle. The first vehicle transmits the sensor data from the sensor of the first vehicle to the second vehicle. Further, the method includes transmitting a second sensor trigger pulse according to the capture interval to the sensor of the second vehicle thereby triggering acquisition of sensor data from the sensor of the second vehicle. The second sensor trigger pulse is offset from the first sensor trigger pulse by the capture interval. The second vehicle transmits the sensor data from the sensor of the second vehicle to the first vehicle.

According to another aspect, a system for controlling vehicle sensor data acquisition using a vehicular communication network includes, a first vehicle configured for computer communication with a second vehicle using the vehicular communication network. The system includes a processor that receives a global time signal from a global positioning source and synchronizes a local clock signal of the first vehicle with the global time signal. The processor determines a capture interval that maximizes a total number of data frames for capture by a sensor of the first vehicle based on a sensor of the second vehicle. The processor transmits a first sensor trigger pulse according to the capture interval to the sensor of the first vehicle thereby triggering acquisition of sensor data from the sensor of the first vehicle. The sensor of the first vehicle transmits the sensor data from the sensor of the first vehicle to the second vehicle. Further, the processor transmits a second sensor trigger pulse according to the capture interval to the sensor of the second vehicle thereby triggering acquisition of sensor data from the sensor of the second vehicle. The sensor of the second vehicle transmits the sensor data from the sensor of the second vehicle to the first vehicle.

According to another aspect, a non-transitory computer-readable storage medium including instructions that when executed by a processor, cause the processor to establish an operable connection for computer communication between a first vehicle and a second vehicle and acquire a global time signal from a global position source. Further, the processor synchronizes a local clock signal of the first vehicle with the global time signal, and synchronizes a local clock signal of the second vehicle with the global time signal. The processor determines a capture interval that maximizes a total number of data frames for capture by a sensor of the first vehicle and by a sensor of the second vehicle. The processor generates a first sensor trigger pulse according to the capture interval to the sensor of the first vehicle thereby triggering acquisition of sensor data from the sensor of the first vehicle, and transmits the sensor data from the sensor of the first vehicle to the second vehicle. Further, the processor generates a second sensor trigger pulse according to the capture interval to the sensor of the second vehicle thereby triggering acquisition of sensor data from the sensor of the second vehicle. The second sensor trigger pulse is offset from the first sensor trigger pulse by the capture interval, and the processor receives the sensor data from the sensor of the second vehicle at the first vehicle.

According to a further aspect, a computer-implemented method for controlling vehicle sensor data acquisition using a vehicular communication network includes, establishing an operable connection for computer communication between a plurality of vehicles using the vehicular communication network. Each vehicle of the plurality of vehicles includes a processor, a local clock, and a sensor. The method includes using the operable connection for computer communication, synchronizing the local clock of each vehicle of the plurality of vehicles with a global time signal from a global positioning source. The method includes determining a capture interval for a clock cycle of the local clock of each vehicle of the plurality of vehicles. The capture interval maximizes a total number of data frames for capture by the sensors of the plurality of vehicles. Further, the method includes alternately capturing, at times offset by the capture interval, sensor data from the sensors of the plurality of vehicles. Each vehicle of the plurality of vehicles transmits the sensor data to the other vehicles in the plurality of vehicles.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 5A is a schematic diagram illustrating minimum synchronization and processing of sensor data between a first vehicle and a second vehicle according to an exemplary embodiment;

DETAILED DESCRIPTION

Figure 1A:
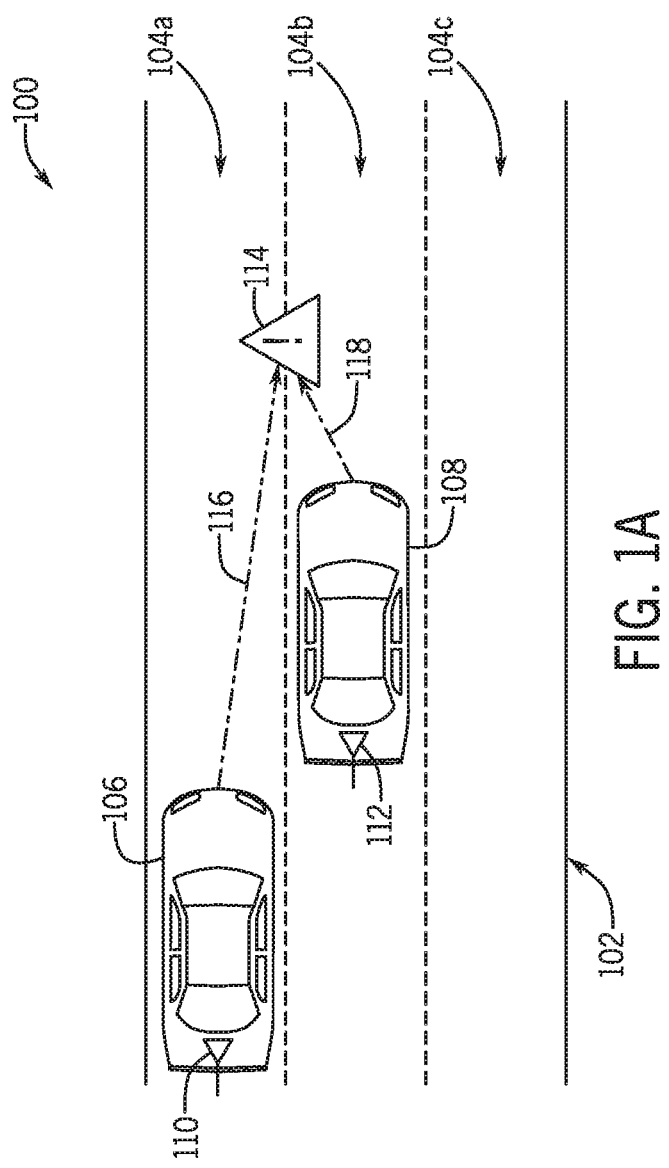
FIG. 1A is a schematic view of an exemplary traffic scenario implementing synchronized vehicle sensor data acquisition processing according to one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods described herein are generally directed to controlling actuation of sensors (e.g., triggering the activation of sensors) of a plurality of vehicles and controlling transmission of sensor data between each of the plurality of vehicles using a vehicle communication network. Synchronized actuation of the sensors and synchronized transmission of sensor data allows the plurality of vehicles to synergistically share relevant sensor information, that each vehicle alone may not be able to acquire and/or process. FIG. 1A illustrates an exemplary traffic scenario 100 implementing synchronized vehicle sensor data acquisition processing that will be used to describe some of the exemplary systems and exemplary methods herein. The traffic scenario 100 involves one or more vehicles on a roadway 102. The roadway 102 has a first lane 104*a*, a second lane 104*b*, and a third lane 104*c*. It is understood that the roadway 102 can have various configurations not shown in FIG. 1A, and can have any number of lanes.

In FIG. 1A, the traffic scenario 100 includes a first vehicle 106 and a second vehicle 108. In some embodiments, the first vehicle 106 can be referred to as a host vehicle (HV) and the second vehicle 108 can be referred to as a remote vehicle. In other embodiments, the first vehicle 106 can be referred to as an initiating vehicle that initiates the synchronization process described herein. However, it is understood that in other embodiments, the second vehicle 108 can be the initiating vehicle. In other embodiments, the first vehicle 106 can be referred to as a master vehicle and the second vehicle 108 can be referred to as a slave vehicle, or vice versa. Further, the first vehicle 106 and the second vehicle 108 can be referred to collectively as a plurality of vehicles. In some embodiments, the systems and methods discussed herein can be implemented with more than two vehicles. Also, it is understood that the first vehicle 106 and the second vehicle 108 can be in different configurations and positions other than those shown in FIG. 1A.

The first vehicle 106 and the second vehicle 108 can communicate as part of a vehicle communication network, which will be discussed in more detail herein with FIG. 1B. The vehicle communication described herein can be implemented using Dedicated Short Range Communications (DSRC). However, it is understood that the vehicle communication described herein can be implemented with any communication or network protocol, for example, ad hoc networks, wireless access within the vehicle, cellular networks, Wi-Fi networks (e.g., IEEE 802.11), Bluetooth, WAVE, CALM, Ultra Wideband, or any other form of wireless communication. Further, the vehicle communication network can be vehicle-to-vehicle (V2V) or a vehicle-to-everything (V2X).

In FIG. 1A, the first vehicle 106 can transmit, receive, and/or exchange communications including data, messages, images, and/or other information with other vehicles, user, or infrastructures, using DSRC. In particular, the first vehicle 106 is equipped with a vehicle-to-vehicle (V2V) transceiver 110 that can exchange messages and information with other vehicles, users, or infrastructures that are operable for computer communication with the first vehicle 106. For example, the V2V transceiver 110 can communicate with the second vehicle 108 via a V2V transceiver 112. As will be discussed herein, the first vehicle 106 and the second vehicle 108, using the V2V transceiver 110 and the V2V transceiver 112, can transmit sensor data to one another acquired by each respective vehicle.

In FIG. 1A, the first vehicle 106 and the second vehicle 108 are approaching a target 114. In some embodiments, the target 114 can be a hazard. The term hazard, or hazardous condition, can refer generally to one or more objects and/or driving scenarios that pose a potential safety threat to a vehicle. In some cases, the term hazard can be used to describe one or more hazardous driving conditions that increase the likelihood of an accident. For example, in FIG. 1A, the target 114 could be a pedestrian. In other embodiments, the target 114 could be debris located in the middle of the roadway 102. In some embodiments, the target 114 could be another vehicle that poses a threat to the first vehicle 106 and/or the second vehicle 108. It is understood that in some embodiments, the target 114 is not a hazard and does not necessarily present a hazardous condition or safety threat to the first vehicle 106 or the second vehicle 108. Instead, the target 114 could simply be part of an environment surrounding the first vehicle 106 and/or the second vehicle 108.

In FIG. 1A, the first vehicle 106 and the second vehicle 108 can "see" or observe the target 114 utilizing respective sensors, which will be discussed in further detail herein with FIG. 1B. As shown in FIG. 1A, the first vehicle 106 emits a sensor pulse 116 towards the target 114, which produces sensor data about the target 114 from the perspective of the first vehicle 106. Similarly, the second vehicle 108 emits a sensor pulse 118 towards the target 114, which produces sensor data about the target 114 from the perspective of the second vehicle 108. Thus, each vehicle "sees" and senses the target 114 from different perspectives (e.g., locations and angles), different times, and at different rates as required by the processing power of each vehicle and each sensor. As will be discussed herein, time synchronization of data capture and data transmission between the first vehicle 106 and the second vehicle 108 according to a global reference time frame, allows the first vehicle 106 and the second vehicle 108 to obtain useful sensor from each other according to accurate timing, that each vehicle alone may not be able to capture and/or process. Sensor data obtained in this way can provide an accurate means to control vehicle driving and/or vehicle systems.

Figure 1B:
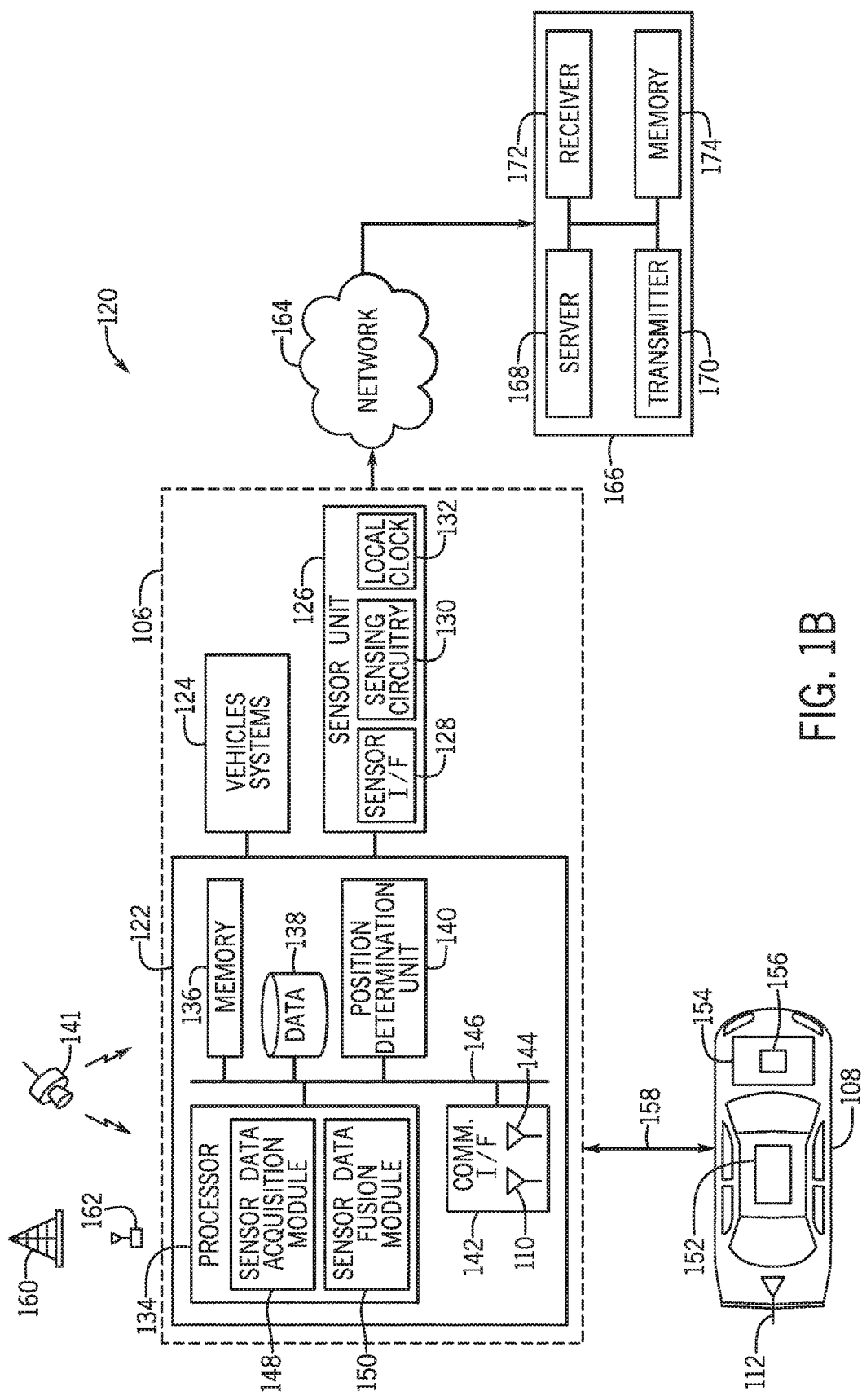
FIG. 1B is a schematic diagram of a vehicle communication network for implementing synchronized vehicle sensor data acquisition processing according to an exemplary embodiment.

Referring now to FIG. 1B, a vehicle communication network 120 for implementing synchronized vehicle sensor data acquisition processing according to an exemplary embodiment will be discussed in detail with reference to FIG. 1A. The components of the first vehicle 106 and the vehicle communication network 120, as well as the components of other systems, hardware architectures, and software architectures discussed herein, can be combined, omitted, or organized into different architectures for various embodiments. In FIG. 1B, the first vehicle 106 includes a vehicle computing device (VCD) 122, one or more vehicle systems 124, and a sensor unit 126. Generally, the VCD 122 includes a processor 134, a memory 136, a data store 138, a position determination unit 140, and a communication interface 142, which are each operably connected for computer communication via a bus 146 and/or other wired and wireless technologies. Some of the components shown in FIG. 1B with respect to the first vehicle 104 are not shown with respect the second vehicle 108. For simplicity, in FIG. 1B, the second vehicle 108 includes a processor 152, a sensor unit 154, and a local clock 156, which can include the same components and functionality discussed in detail with the first vehicle 104. It is understood that although not shown in FIG. 1B, one or more of the components of the first vehicle 106, can also be implemented with the second vehicle 108, or other vehicles discussed herein.

Referring again to the first vehicle 104, the VCD 122, can include provisions for processing, communicating and interacting with various components of the first vehicle 106 and other components of the vehicle communication network 120, including the second vehicle 108. In one embodiment, the VCD 122 can be implemented with the first vehicle 106, for example, as part of a telematics unit, a head unit, an infotainment unit, an electronic control unit, an on-board unit, or as part of a specific vehicle control system, among others. In other embodiments, the VCD 122 can be implemented remotely from the first vehicle 106, for example, with a portable device (not shown) or a device (e.g., remote processor/server) connected via the vehicle communication network 120.

The processor 134 can include logic circuitry with hardware, firmware, and software architecture frameworks for facilitating synchronized vehicle sensor data acquisition processing with the components of the VCD 122 and the vehicle communication network 120. Thus, in some embodiments, the processor 134 can store application frameworks, kernels, libraries, drivers, application program interfaces, among others, to execute and control hardware and functions discussed herein. For example, in FIG. 1B, the processor 134 can include a sensor data acquisition module 148 and sensor data fusion module 150. In some embodiments, the memory 136 and/or the data store (e.g., disk) 138 can store similar components as the processor 134 for execution by the processor 134.

The position determination unit 140 can include hardware (e.g., sensors) and software to determine a position (e.g., an absolute position and/or a relative position) of the first vehicle 106. For example, the position determination unit 140 can include a global positioning system (GPS) unit and/or an inertial measurement unit (IMU). In some embodiments, the position determination unit can be a navigation system that provides navigation maps and navigation information to the first vehicle 106. Thus, the position determination unit 140 can be any type of known, related or later developed navigational system. The phrase "navigation information" refers to any information that can be used to assist the first vehicle 106 in navigating a roadway or path. Navigation information may include traffic data, map data, and roadway classification information data. Navigation information can also include geographical information, including information obtained from any Global Navigational Satellite infrastructure (GNSS), including Global Positioning System or Satellite (GPS), Glonass (Russian) and/or Galileo (European). In particular, in FIG. 1B, the position determination unit 140 can obtain information from the global positioning source 141. As will be discussed herein, the position determination unit 140 can be used to localize the first vehicle 106 and/or the second vehicle 108.

The communication interface 142 can include software and hardware to facilitate data input and output between the components of the VCD 122 and other components of the vehicle communication network 120. Specifically, the communication interface 142 can include network interface controllers (not shown) and other hardware and software that manages and/or monitors connections and controls bi-directional data transfer between the communication interface 142 and other components of the vehicle communication network 120. More specifically, and as mentioned with FIG. 1A above, the VCD 122 can exchange vehicle data, including sensor data (e.g., from the sensor unit 126), with other DSRC compatible vehicles via the V2V transceiver 110. For example, the V2V transceiver 110 can exchange data with the second vehicle 108 via the V2V transceiver 112 using a communication link 158. Although only two vehicles are shown in FIG. 1B, it is understood that the first vehicle 106 can communicate with more than one vehicle configured for communication (e.g., DSRC) within the vehicle communication network 120. Thus, is some embodiments, communication links using DSRC can be established between the first vehicle 106 and a plurality of other vehicles (e.g., plurality of remote vehicles) configured for V2V communication using DSRC.

As will be discussed herein, various types of data can be communicated using the vehicle communication network. In some embodiments, data is communicated via DSRC by exchanging one or more basic safety messages (BSM). The BSM that is broadcast by a vehicle can contain a number of data elements that describe various aspects of the operation of the vehicle or provide information about the vehicle itself. For example, the type and/or specifications of the vehicle, navigation data, roadway hazard data, traffic location data, course heading data, course history data, projected course data, kinematic data, current vehicle position data, range or distance data, speed and acceleration data, location data, vehicle sensory data, vehicle subsystem data, and/or any other vehicle information. Some of the embodiments discussed herein include exchanging data and information between networked vehicles for use in vehicle driving.

In the embodiments discussed herein, synchronization of sensor data acquisition is executed based on information communicated between the first vehicle 106 and the second vehicle 108 using the communication link 158 established by DSRC. In other embodiments, the first vehicle 106 and the second vehicle 108 can exchange sensor data utilizing a wireless network antenna 160, roadside equipment (RSE) 162, a communication network 164, which can be a wireless communication network, or other wireless network connections.

Further, in some embodiments, synchronization of sensor data acquisition and data transmission can be executed at other infrastructures and servers, and data can be exchanged with other infrastructures and servers. For example, in FIG. 1B, the VCD 122 can transmit and receive information directly or indirectly to and from a service provider 166 over the communication network 164. The service provider 166 can include a remote server 168, a remote transmitter 170, a remote receiver 172, and a remote memory 174 that are configured to be in communication with one another. In FIG. 1B, the V2V transceiver 110 can be used by the VCD 122 to receive and transmit information to and from the service provider 166 and other servers, processors, and information providers through the communication network 164. In alternative embodiments, a radio frequency (RF) transceiver 144 in the first vehicle 106 can be used to receive and transmit information to and from the service provider 166. In some embodiments, the VCD 122 can receive and transmit information to and from the service provider 166 including, but not limited to, traffic data, vehicle location and heading data, high-traffic event schedules, weather data, or other transport related data. In some embodiments, the service provider 166 can be linked to multiple vehicles (e.g., the second vehicle 108) through a network connection, such as via the wireless network antenna 160, and/or other network connections.

Using the network configuration discussed above, the first vehicle 106 and the second vehicle 108 can coordinate actuation of sensors (e.g., trigger activation of sensors) and transmission of sensor data between one another. The sensing configuration will now be described in more detail with respect to the sensor unit 126, which can include a sensor interface 128, a sensing circuitry 130, and a local clock 132. As mentioned above, for simplicity, the second vehicle 108 includes the sensor unit 154 and the local clock 156, however, the second vehicle 108 can include one or more other components as discussed with the sensor unit 126 (e.g., a sensor interface, sensing circuitry). Although only one sensor unit 126 is shown with the first vehicle 104, It is understood that first vehicle 106 can include one or more sensor units and that each sensor unit can include one or more sensors (e.g., implemented by sensing circuitry 130). In some examples discussed herein, the sensor unit 126 is simply referred to as a sensor or sensors. In some embodiments, the sensor unit 126 can be associated with one or more of the vehicle systems 124.

With respect to the sensor unit 126, the sensor interface 128 interfaces with the sensing circuitry 130 to facilitate capture and processing of sensor data by the sensing circuitry 130. The VCD 122, using the processor 134, can control sensor actuation and acquire sensor data from the sensing circuitry 130 via the sensor interface 128. The sensing circuitry 130 can include various types of sensors for capturing various types of information (e.g., sensor data). For example, the sensing circuitry 130 can include vision sensors (e.g., cameras) for capturing image or video information. In other embodiments, the sensing circuitry 130 can include ranging sensors (e.g., LIDAR, RADAR) for capturing distance or speed information.

It is understood that the sensing circuitry 130 can include various types of sensors for use with the first vehicle 106 and/or the vehicle systems 124 for detecting and/or sensing a parameter of that system. Further, it is understood that the sensor unit 126 could be disposed in one or more portions of the first vehicle 106. For example, although not shown in FIG. 1B, the sensors could be integrated into a dashboard, seat, seat belt, door, bumper, front, rear, corners, dashboard, steering wheel, center console, roof or any other portion of the first vehicle 106. In other cases, however, the sensors could be portable sensors worn by a driver (not shown), integrated into a portable device (not shown), carried by the driver (not shown), integrated into an article of clothing (not shown) worn by the driver or integrated into the body of the driver (e.g. an implant) (not shown).

In some of the examples discussed with the systems and methods herein, the sensor unit 126 will be described as a vision sensor unit that includes one or more cameras that may be mounted on the first vehicle 106, for example, mounted on a windshield, a front dashboard, a grill, a rear-view mirror, among others. In other embodiments discussed herein, the sensor unit 126 can include ranging sensors. For example, a front long range RADAR and/or a front mid-range RADAR. The front long range RADAR can measure distance (e.g., lateral, longitudinal) and speed of objects surrounding the first vehicle 106. For example, the first long range RADAR can measure distance and speed of other vehicles (e.g., the second vehicle 108) and/or the target 114 surrounding the first vehicle 106. In other embodiments, the sensor unit 126 can include a plurality of RADARs in different location of the first vehicle 106. For example, a front left RADAR located at a front left corner area of the first vehicle 106, a front right RADAR located at a front right corner area of the first vehicle 106, a rear left RADAR located at a rear left corner area of the first vehicle 106, and a rear right RADAR located at a rear right corner area of the first vehicle 106.

Although vision sensors and ranging sensors are discussed throughout the examples herein, it is understood that other sensors can be implemented. Exemplary sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others. It is also understood that the sensor unit 126 can include sensors of any type, for example, acoustic, electric, environmental, optical, imaging, light, pressure, force, thermal, temperature, proximity, among others.

Furthermore, in some embodiments discussed herein, the sensor unit 126 can also include sensors classified as active sensors or passive sensors. An active sensor includes a transmitter that sends out a signal, light, electrons, among others, to be bounced off a target (e.g., the target 114), with data gathered by the sensor upon their reflection. Thus, active sensors transmit and detect energy at the same time. Illustrative examples of active sensors include, but are not limited to, LIDAR, RADAR, sonar, and infrared. A passive sensor detects and responds to some type of input from the physical environment. For example, passive sensors gather sensor data through the detection of vibrations, light, radiation, heat, among others. Illustrative examples of passive sensors include, but are not limited to, photographic (e.g., vision), thermal, electric field sensing, and infrared. It is understood that some types of sensors can be both active and passive sensors, for example, infrared sensors.

Referring again to FIG. 1B, the local clock 132 is a mechanism that controls timing of the instruction cycle of the sensing circuitry 130. Thus, the timing of actuation of the sensor unit 126 and/or the timing of the transmission of the sensor data captured by the sensor unit 126 is aligned with and controlled by the local clock 132. More specifically, the local clock 132 can generate a local clock signal as a reference timing signal for synchronizing capture of sensor data by actuation of the sensing circuitry 130. In some embodiments, the local clock 132 can be implemented within the processor 134. In other embodiments, the sensor unit 126 can have a dedicated processor with the local clock 132. In some embodiments, which will be discussed herein, the local clock 132 is based on an external timing signal (e.g., satellite based), for example, based on a pulse per second (PPS) signal received from the global positioning source 141. By using the PPS signal to align the local clock 132 signal, the timing of the local clock 132 is reliable and accurate. Furthermore, as will be discussed herein in further detail, by aligning the local clock 132 with the PPS signal from the global positioning source 141 and aligning the local clock 156 with the PPS signal from the global positioning source 141, the first vehicle 106 and the second vehicle 108 can control timing of sensor activation transmission of sensor data according to the same reference time signal (e.g., common time base). It is understood that in some embodiments, different types of times sources can be implemented other than PPS.

An illustrative example of sensor data capture using the sensor unit 126 will now be discussed. As mentioned above, the local clock 132 is synchronized with the global time signal (e.g., PPS signal) from the global positioning source 141. The processor 134 and/or the sensor interface 128 generates a number of sensor trigger pulses per clock cycle (i.e., per second according to the PPS signal). Each sensor trigger pulse actuates the sensing circuitry 130 (e.g., transmitting the sensor pulse 116) and thereby actuates capture of a data frame. The data frame is processed by the sensor unit 126 and/or the processor 134. After processing, and as will be discussed herein in more detail, the data frame can be transmitted, for example, to the second vehicle 108. Accordingly, a sensor trigger pulse controls the sensor unit 126 to capture a data frame of sensor data and process the data frame. This process, which can be referred to herein as a sensor data acquisition process, repeats for each sensor trigger pulse.

The sensor data acquisition process requires an amount of time (e.g., a sensor data acquisition process time) to execute. This amount of time can be based on the processing power of the processor 134 and/or the processing power of the sensor unit 126. Accordingly, the number of sensor trigger pulses per clock cycle and/or the number of data frames captured per clock cycle (i.e., data frame rate) can be limited based on the sensor data acquisition process time and/or the processing power. Thus, the first vehicle 106 can be limited in the granularity of sensor data it can capture and the type of sensor data it can capture. By controlling actuation of sensors for a plurality of vehicles, including the first vehicle 106 and the second vehicle 108, and sharing the resulting sensor data by controlling transmission of said sensor data, the first vehicle 106 and the second vehicle 108 can obtain useful sensor information, that each vehicle alone may not be able to capture and/or have the capability to process. Exemplary systems and methods for controlling actuation of sensors of a plurality of vehicles and controlling transmission of sensor data of a plurality of vehicles using the vehicle communication network 120 discussed above will now be described in more detail.

II. Maximum Time Synchronized Vehicle Sensor Data Acquisition Processing

Figure 2:
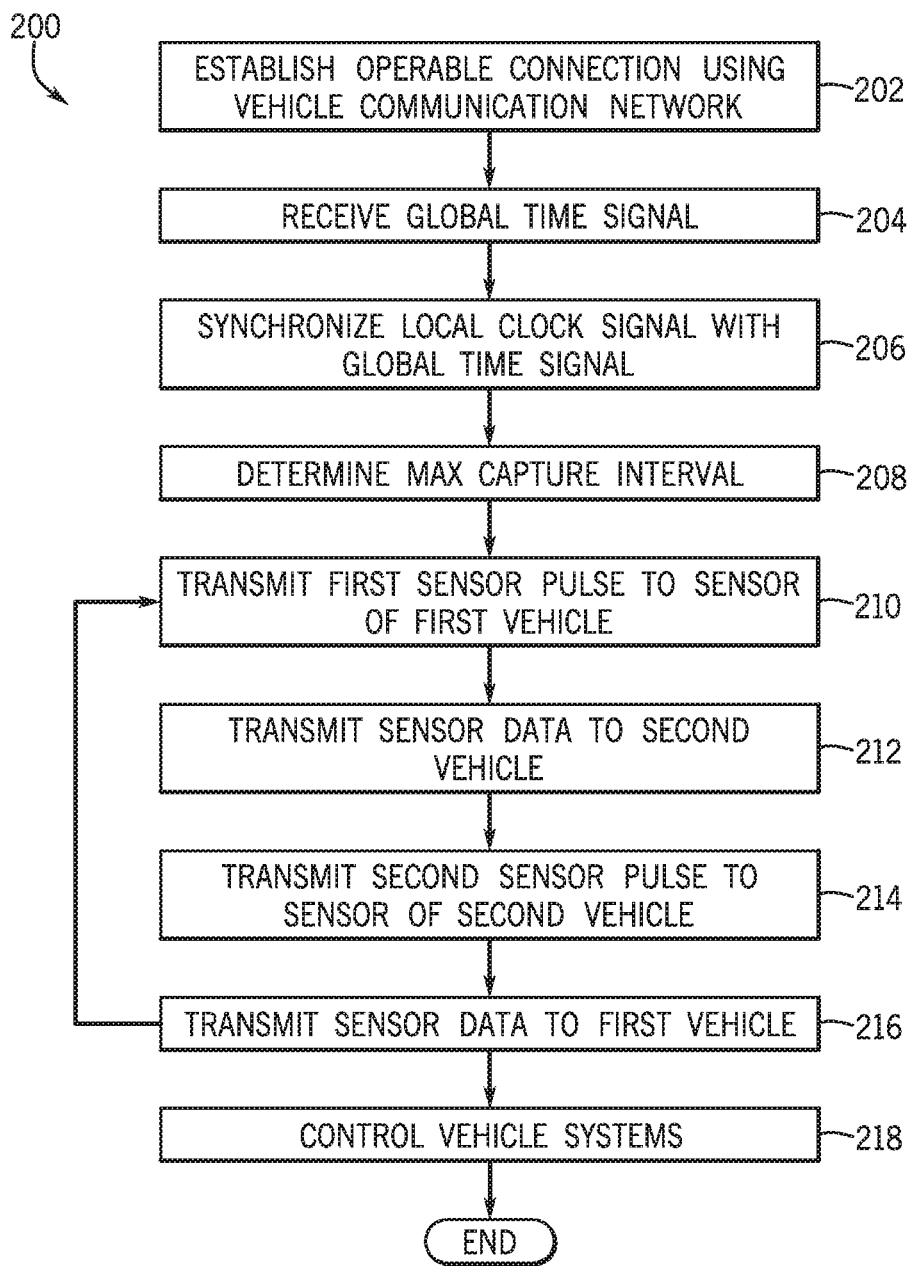
FIG. 2 is a process flow diagram of a method for synchronized vehicle sensor data acquisition processing using vehicular communication according to an exemplary embodiment.

In one embodiment, vehicle sensor data acquisition and vehicle sensor data transmission using vehicular communication is synchronized between more than one vehicle to maximize the time actuation of sensor data captured and processed by each vehicle. Referring now to FIG. 2, a method 200 for controlling vehicle sensor data acquisition using the vehicle communication network 120 will be discussed with reference to FIGS. 1A and 1B. At block 202, the method 200 includes, establishing an operable connection for computer communication between a first vehicle and a second vehicle using a vehicular communication network. For example, the communication interface 142 can establish a communication link 158 between the first vehicle 106 and the second vehicle 108. The communication link 158 can be established between V2V transceivers. For example, the V2V transceiver 110 can continuously search for signals from other V2V transceivers, such as by emitting a periodic signal that searches for a reply. In other embodiments, the V2V transceiver 110 may emit periodic signals searching for a reply from an in-range V2V transceiver. If a V2V transceiver replies (e.g., from the second vehicle 108), then the communication link 158 may be established.

In some embodiments, a communication link is established based on detecting a trigger event for time synchronized vehicle sensor data acquisition and processing. For example, the processor 134 can monitor the environment surrounding the first vehicle 106 and/or monitor data about the first vehicle 106 to detect a trigger event. In one embodiment, a trigger event is detected when the first vehicle 106 detects a hazardous condition, for example the target 114. A trigger event can be detected upon a particular sensor being actuated. In other embodiments, a trigger event can be detected upon detecting another vehicle within a predetermined proximity to the first vehicle 106 or within a communication range of the first vehicle 106. In this embodiment, the first vehicle 106 may identify other the vehicles within a communication range. Thus, an operable connection for computer communication can be made between each vehicle in a plurality of vehicles or between each vehicle in the plurality of vehicles and the first vehicle 106 using the vehicular communication network 120. In scenarios where the first vehicle 106 detects a trigger event, the first vehicle 106 may be considered an initiating vehicle and/or a master vehicle, that then establishes an operable connection for computer communication with other vehicles capable of V2V communication with the first vehicle 106. In other embodiments, the second vehicle 108 can detect the trigger event and initiate the operable connection. Further, it is understood that other types of trigger events other than those discussed herein can be contemplated.

Referring again to FIG. 2, at block 204, the method 200 includes, receiving a global time signal. For example, the processor 134 and/or the sensor data acquisition module 148 of the first vehicle 106 can receive a global time signal from a global receiver, for example, the global positioning source 141. As discussed above, in some embodiments, the global time signal is a pulse per second (PPS) signal. Similarly, the processor 152 of the second vehicle 108 can receive a global time signal from a global receiver, for example, the global positioning source 141. Again, in this embodiment, the global time signal is a PPS signal.

Accordingly, at block 206, the processor 134 and/or the sensor data acquisition module 148 can synchronize a local clock signal (e.g., of the local clock 132) with the global time signal. Further, the processor 152 can synchronize a local clock signal (e.g., of the local clock 156) with the global time signal. Thus, each local clock of a plurality of vehicles can be synchronized according to the global time signal. By synchronizing the local clock 132 of the first vehicle 104 and the local clock 156 of the second vehicle 108, the timing of the instruction cycle of the first vehicle 106, namely, the sensor unit 126, and the second vehicle 108, namely, the sensor unit 154, will made with reference to the same global reference time base.

At block 208, the method 200 includes, determining a capture interval for a sensor data acquisition process time. A capture interval, as used within this description, is a period of time between actuation of the sensor unit 126 and actuation of the sensor unit 154. This can be a period of time between transmitting a sensor trigger pulse that actuates the sensor unit 126 and transmitting a sensor trigger pulse that actuates the sensor unit 154. Said differently, the capture interval is a period of time between a time a data frame is captured by the first vehicle 104 and a time a data frame is captured by the second vehicle 108. The capture interval is determined for a sensor data acquisition process time. Sensor data acquisition is the trigger process loop executed by the sensor including data capture and data processing for one data frame. Thus, the sensor data acquisition process time is the amount of time required to capture a data frame of sensor data and process the data frame.

Figure 3A:
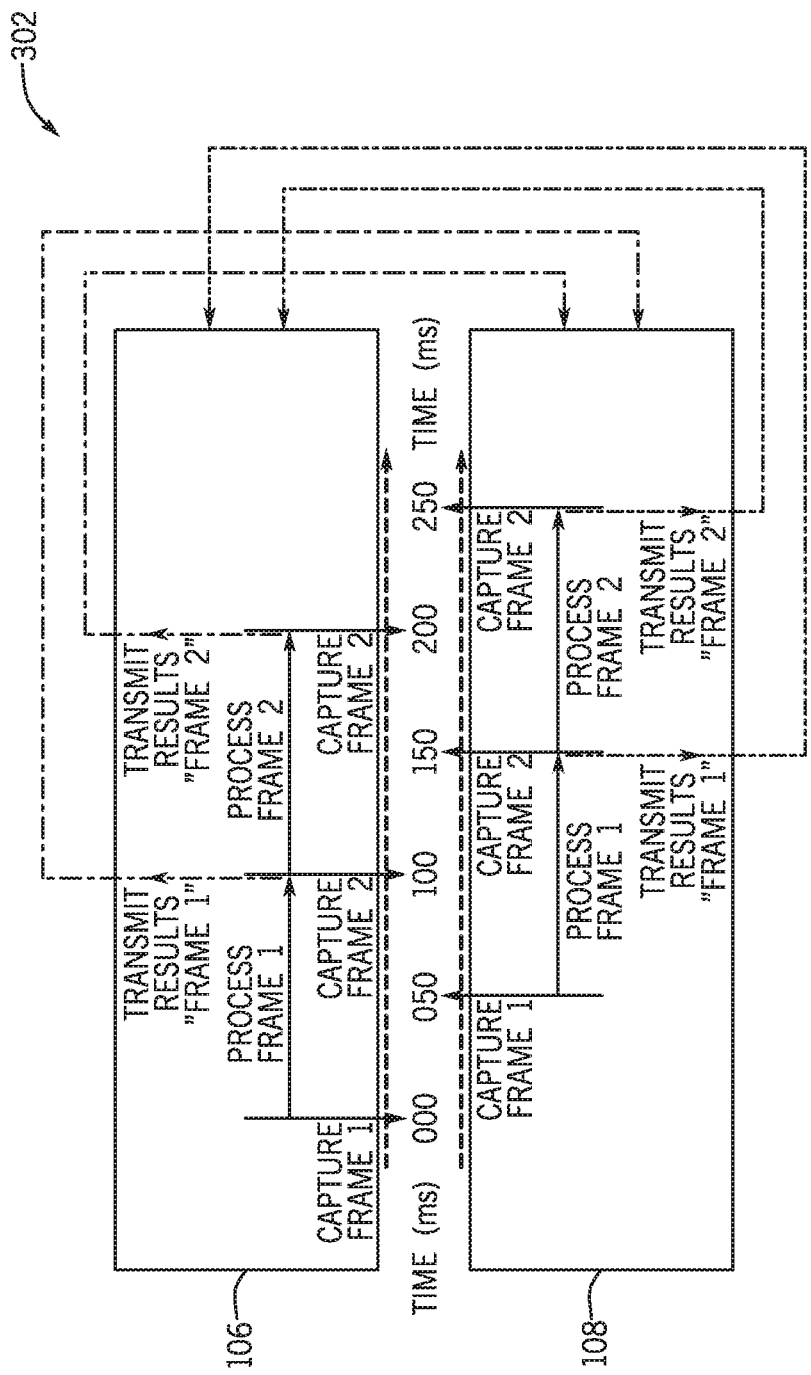
FIG. 3A is a schematic diagram illustrating f and processing of sensor data between a first vehicle and a second vehicle according to an exemplary embodiment.

As an illustrative example with reference to the diagram 302 shown in FIG. 3A, the sensor data acquisition process time for the first vehicle 106 is the time at the start of Capture Frame 1 (0 s) to the end of Process Frame 1 (100 ms). Thus, the sensor data acquisition process time is 100 ms. According to this sensor data acquisition process time, the first vehicle 106 can capture ten (10) frames in one (1) second or one clock cycle according to the local clock 132. Thus, the data frame rate the first vehicle 106 is capable of executing using its own sensor hardware is ten (10). As will be described herein, and as shown in FIG. 3A, by synchronizing timing of sensor activation and timing of sensor data transmission between more than one vehicle, a vehicle can realize an increased data frame rate and obtain useful sensor data from the perspectives of the other vehicles.

Figure 3B:
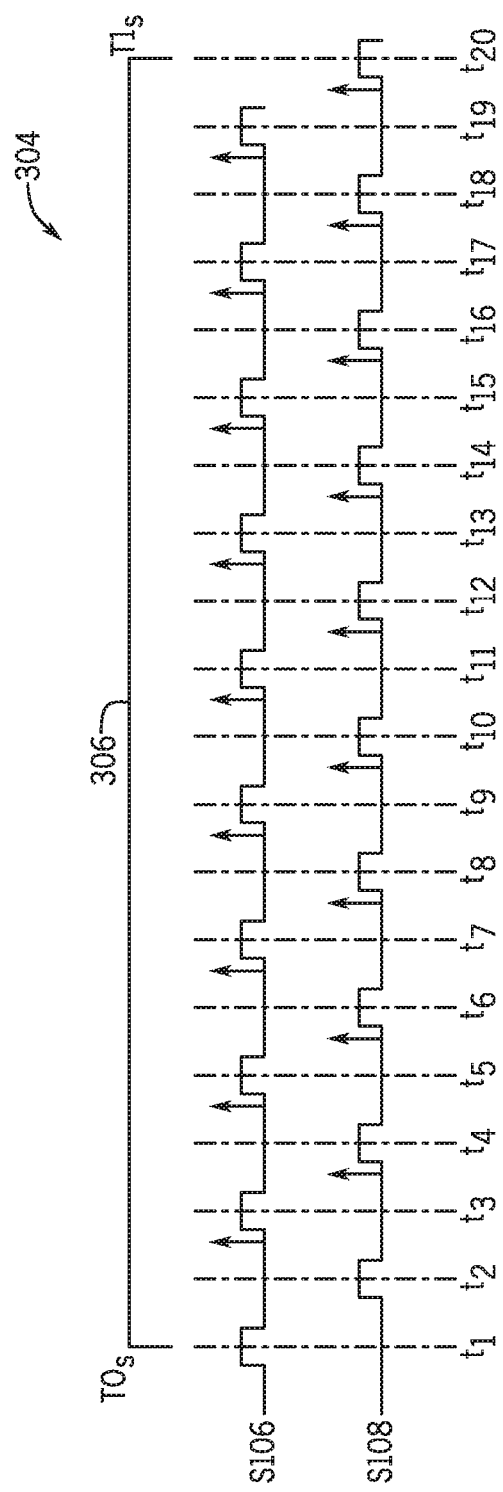
FIG. 3B is a schematic timing diagram of the maximum synchronization and processing of sensor data of FIG. 3A according to an exemplary embodiment.

As mentioned above, the processor 134 and/or the sensor data acquisition module 148 can determine and/or calculate the capture interval that maximizes a total number of data frames that can be captured by the sensor unit 126 of the first vehicle 106 and by the sensor unit 154 of the second vehicle 108. In other words, the capture interval maximizes a time between actuation of the sensor unit 126 of the first vehicle 106 and actuation of the sensor unit 154 of the second vehicle 108. As discussed above with FIG. 3A, the number of data frames that can be captured by the sensor unit 126 of the first vehicle 106 is ten (10), based on the sensor data acquisition process time of the first vehicle 106. The number of data frames that can be captured by the sensor unit 154 of the second vehicle 108 is ten (10), based on the sensor data acquisition process time of the second vehicle 108. Accordingly, the capture interval time is based on the total number of data frames that can be captured by the sensor unit 126 of the first vehicle 106 and by the sensor unit 154 of the second vehicle 108, namely, 20 data frames. Thus, in this embodiment, the capture interval time is 50 ms. As shown in FIG. 3A, the capture interval time is 50 ms between each capture by the first vehicle 107 and each capture by the second vehicle 108. This is also shown in FIG. 3B, over one clock cycle 306 (i.e., one (1) second), from T equals zero (0) seconds to one (1) second.

In a further embodiment, determining the capture interval for the sensor data acquisition process time that maximizes the total number of data frames is based on a number of vehicles within a predetermined distance from the first vehicle 104, or alternatively, the number of vehicles configured for operable computer communication via the vehicle communication network 120 to the first vehicle 104. Said differently, the capture interval maximizes a total number of data frames for capture by the sensors of the plurality of vehicles based on a number of the plurality of vehicles. For example, in one embodiment, at block 202 and/or at block 208, the first vehicle 104 can select one or more vehicles surrounding the first vehicle 104 to synchronize vehicle sensors data acquisition and transmission. In one embodiment, the first vehicle 104 can select one or more vehicles within a predetermined distance from the first vehicle 104, for example, within 300 m of the first vehicle 104. In another embodiment, the first vehicle 104 can select one or more vehicles based on a geoposition of the first vehicle 104, the one or more other vehicles, and/or the target 114. In another embodiment, determining the capture interval for the sensor data acquisition process time that maximizes the total number of data frames is based on a distance between the first vehicle 104 and the second vehicle 108. For example, the smaller the distance between the first vehicle 104 and the second vehicle 108, the larger the capture interval.

In one embodiment, at block 208, the method 200 optionally includes transmitting a message from the first vehicle 104 to the second vehicle 108, the message including the capture interval. In some embodiments, the message includes the capture interval and a start time for data acquisition of the sensor data from the sensor unit 154 of the second vehicle 108. Thus, the processor 134 and/or the processor 134 can set a start time for data acquisition of the sensor data from the sensor unit 154 of the second vehicle 108. The start time for data acquisition of the sensor data from the sensor unit 154 of the second vehicle 108 is offset by the capture interval from a start time for data acquisition of the sensor data from the sensor unit 126 of the first vehicle 104. As an illustrative example, FIG. 3B is a timing diagram 304 showing the capture intervals and actuation times for the first vehicle 106 and the second vehicle 108. A sensor trigger pulse activates the sensor unit 126 of the first vehicle 106 at $t_1$ (0 s) and a sensor trigger pulse activates the sensor unit 154 of the second vehicle 108 at $t_2$ (50 ms). Thus, the start time for data acquisition of the sensor data from the sensor unit 154 of the second vehicle 108 is offset by the capture interval from a start time for data acquisition of the sensor data from the sensor unit 126 of the first vehicle 104. In another embodiment, the method 200 can also include setting a start time for sensor data acquisition at each vehicle of the plurality of vehicles according to the local clock of each vehicle of the plurality of vehicles. Similar to the process described above, the start time for each vehicle is displaced from one another by the capture interval.

In some embodiments, at block 208, the method 200 can also include determining a transmission interval. A transmission interval, as used within this description, is a period of time between transmission and/or communication of sensor data from the sensor unit 126 to the second vehicle 108, and from the sensor unit 154 to the first vehicle 106. In other embodiments, the transmission interval can be a period of time from transmission of a sensor trigger pulse that actuates the sensor unit 126 and a period of time from transmission of a sensor trigger pulse that actuates the sensor unit 154. Said differently, in this embodiment, the transmission interval can be a period of time from when the sensor data is captured at the first vehicle 106 and/or at the second vehicle 108. For example, as shown in FIG. 3A, the first vehicle 106 captures frame 1 at 0 ms and transmits the results of frame 1 (e.g., after processing of frame 1) at 100 ms to the second vehicle 108. Similarly, the second vehicle 108 captures frame 1 at 50 ms and transmits the results of frame 1 (e.g., after processing of frame 1) at 150 ms to the first vehicle 106. In this embodiment, the transmission interval for the first vehicle 106 and the second vehicle 108 is 100 ms. In some embodiments, the transmission interval is based on the capture interval and a sensor data acquisition process time. Further, in some embodiments, the transmission interval is equal to the capture interval. Accordingly, in addition to synchronizing the timing of data capture, the timing of transmission of sensor data can also be synchronized between the first vehicle 106 and the second vehicle 108.

At block 210, the method 200 includes, transmitting and/or generating a first sensor trigger pulse according to the capture interval to the sensor of the first vehicle thereby triggering acquisition of sensor data from the sensor of the first vehicle. For example, the processor 134 and/or the sensor data acquisition module 148 can transmit a first sensor trigger pulse according to the capture interval to the sensor unit 126 of the first vehicle 104 thereby triggering acquisition of sensor data from the sensor unit 126 of the first vehicle 104. Said differently, the processor 134 can generate a first sensor trigger pulse according to the capture interval to the sensor unit 126 of the first vehicle 104 thereby triggering acquisition of sensor data from the sensor unit 126 of the first vehicle 104. For example, as shown in FIG. 3B, the sensor unit 126 of the first vehicle 106 is activated and captures sensor data at times: $t_1$, $t_3$, $t_5$, $t_7$, $t_9$, $t_{11}$, $t_{13}$, $t_{15}$, $t_{17}$, and $t_{19}$.

Therefore, at block 212, the first vehicle 104 (e.g., the processor 134 via the V2V transceiver 110) using the communication network 120 transmits the sensor data captured by the sensor unit 126 of the first vehicle 104 to the second vehicle 108. In some embodiments, the transmission of sensor data is executed according t to the transmission interval. In FIG. 3B, the upward pointing arrows illustrate times at which the first vehicle 104 transmits the sensor data captured by the sensor unit 126 of the first vehicle 104 to the second vehicle 108. Accordingly, the transmission of the sensor data from the first vehicle 106 to the second vehicle 108 is also synchronized according to the global time signal.

At block 214, the method 200 includes, transmitting and/or generating a second sensor trigger pulse according to the capture interval to the sensor of the second vehicle. For example, the processor 134 (e.g., the sensor data acquisition module 138) and/or the processor 152 can transmit a second sensor trigger pulse according to the capture interval to the sensor unit 154 of the second vehicle 108, thereby triggering acquisition of sensor data from the sensor unit 154 of the second vehicle 108. In one embodiment, the second sensor trigger pulse is offset from the first sensor trigger pulse by the capture interval. For example, the processor 134 and/or the processor 152 transmits the second sensor trigger pulse at a time offset by the capture interval from a time the first sensor trigger pulse is transmitted. Said differently, transmitting the second sensor trigger pulse can include transmitting the second sensor trigger pulse at a time offset by the capture interval from the first sensor trigger pulse by the capture interval, thereby triggering acquisition of the sensor data from the sensor unit 154 of the second vehicle 108 at a time offset by the capture interval from the acquisition of the sensor data from the sensor unit 126 of the first vehicle 104. For example, as shown in FIG. 3B, the sensor unit 154 of the second vehicle 108 is activated and captures sensor data at times $t_2$, $t_4$, $t_6$, $t_8$, $t_{10}$, $t_{12}$, $t_{14}$, $t_{16}$, $t_{18}$, and $t_{20}$.

Accordingly, at block 216, the method 200 includes, the second vehicle 108 transmitting the sensor data from the sensor 154 of the second vehicle 108 to the first vehicle 106. Thus, the first vehicle 106 receives the sensor data from the second vehicle 108. As mentioned above, transmission of the sensor data can be based on the transmission interval. In FIG. 3B, the upward pointing arrows illustrate times at which the second vehicle 108 transmits the sensor data captured by the sensor unit 154 of the second vehicle 108 to the first vehicle 106. Accordingly, the transmission of the sensor data from the second vehicle 108 to the first vehicle 106 is also synchronized according to the global time signal.

In other embodiments, and as supported by the description of blocks 210, 212, 214, and 216 above, the method 200 includes alternately capturing, at times offset by the capture interval, sensor data from the sensors of the plurality of vehicles, where each vehicle of the plurality of vehicles transmits the sensor data to the other vehicles in the plurality of vehicles. For example, in FIG. 3B, the first vehicle 106 and the second vehicle 108 alternately capture sensor data at times offset by the capture interval. The first vehicle 106 captures at time $t_1$, the second vehicle 108 captures at time $t_2$, the first vehicle 106 captures at time $t_3$, the second vehicle 108 captures at time $t_4$, and so on.

Referring again to FIG. 2, at block 218, the method 200 includes, controlling the vehicle systems based in part, on the sensor data shared between the vehicles. For example, the processor 134 controls one or more vehicle systems 124 of the first vehicle 104 based on the sensor data from the sensor unit 126 of the first vehicle 104 and the sensor data from the sensor unit 154 of the second vehicle 108. In particular, in some embodiments, the sensor data fusion module 150 can use data fusion of the data captured by the first vehicle 106 and the data captured by the second vehicle 108 to control one or more of the vehicle systems 124. As will be discussed in detail herein, in one embodiment, controlling the vehicle systems 124 includes controlling localization of the first vehicle 106 and/or the second vehicle 108.

III. Minimum Time Synchronized Vehicle Sensor Data Acquisition Processing

Figure 4:
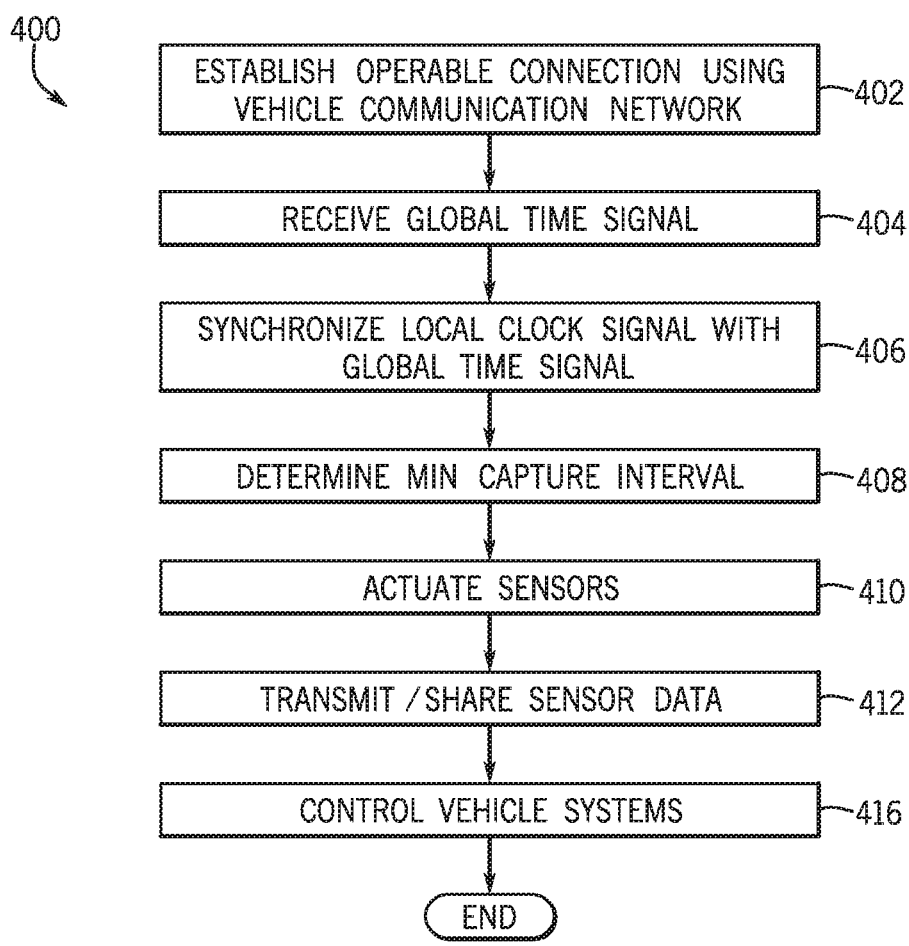
FIG. 4 is a process flow diagram of another method for synchronized vehicle sensor data acquisition processing using vehicular communication according to an exemplary embodiment.

As discussed above, vehicle sensor data acquisition and vehicle sensor data transmission using vehicular communication can be synchronized between more than one vehicle to maximize actuation of sensors captured by each vehicle. In other embodiments, which will now be discussed in more detail, vehicle sensor data acquisition and vehicle sensor data transmission using vehicular communication can be synchronized between more than one vehicle to minimize the time actuation of sensor data captured by each vehicle. Referring now to FIG. 4, a method 400 for controlling vehicle sensor data acquisition using a vehicular communication network with reference to FIGS. 1A, 1B, and 2 will be discussed. For simplicity, like numbered blocks in FIG. 4 are similar to like-numbered elements described in reference to FIG. 2.

Similar to block 202 of FIG. 2, the method 400 includes at block 402, establishing an operable connection for computer communication between a first vehicle and a second vehicle using a vehicular communication network. For example, as discussed with FIG. 2 in detail, a communication link 158 is established between the first vehicle 106 and the second vehicle 108. At block 404, the method 400 includes, receiving a global time signal. For example, as discussed in detail with FIG. 2, the processor 134 of the first vehicle 106 can receive a global time signal from the global positioning source 141, and the processor 152 of the second vehicle 108 can receive a global time signal from the global positioning source 141. Further, at block 406, the local clocks of each vehicle are synchronized with the global time signal. For example, as discussed in detail with FIG. 2, the processor 134 can synchronize a local clock signal (e.g., of the local clock 132) with the global time signal, and the processor 152 synchronize a local clock signal (e.g., of the local clock 156) with the global time signal. Accordingly, each vehicle is synchronized according to the same common time base and can actuate sensors and/or transmit sensor data based on the same common time base.

At block 408, the method 400 includes, determining a capture interval for a sensor data acquisition process. In this embodiment, the capture interval is determined and/or calculated to minimize a time between triggering actuation of the sensor unit 126 of the first vehicle 106 and the sensor unit 154 of the second vehicle 108. As discussed above in detail with FIG. 2, a capture interval, as used within this description, is a period of time between actuation of the sensor unit 126 and actuation of the sensor unit 154. This can be a period of time between transmitting a sensor trigger pulse that actuates the sensor unit 126 and transmitting a sensor trigger pulse that actuates of the sensor unit 154. Sensor data acquisition includes the trigger process loop executed by the sensor including data capture and data processing for one data frame. Thus, the sensor data acquisition process time is the amount of time required to capture a data frame of sensor data and process the data frame.

In one embodiment, the capture interval is determined and/or calculated to minimize the time between the actuation of the sensor unit 126 of the first vehicle 106 and the sensor unit 154 of the second vehicle 108, so that the actuation of the sensor unit 126 of the first vehicle 106 is at substantially the same time as the actuation the sensor unit 154 of the second vehicle 108 according to the capture interval. Thus, in some embodiments, the capture interval is determined to minimize the time to zero (0) between triggering actuation of the sensor unit 126 of the first vehicle 106 and the sensor unit 154 of the second vehicle 108. As an illustrative example with reference to the diagram 502 shown in FIG. 5A, the sensor data acquisition process time for the first vehicle 106 is the time at the start of Capture Frame 1 (0 ms) to the end of Process Frame 1 (100 ms). According to this sensor data acquisition process time (i.e., 100 ms), the first vehicle 106 can capture ten (10) frames in one (1) second or one clock cycle according to the local clock 132. Accordingly, to minimize the time between actuation of the sensor unit 126 and the sensor unit 154, the capture interval time is 100 ms. As shown in FIG. 5A, the first vehicle 106 and the second vehicle 108 capture a data frame of sensor data at substantially the same time, every 100 ms according to the capture interval.

In some embodiments, the capture interval minimizes the time between the actuation of the sensor unit 126 of the first vehicle 106 and the sensor unit 154 of the second vehicle 108 within a predetermined tolerance threshold (e.g., a predetermined number of milliseconds). Further, as discussed above with FIG. 2, in some embodiments, the capture interval and/or the predetermined tolerance threshold can be based on a number of vehicles within a predetermined distance from the first vehicle 104, a number of vehicles configured for operable computer communication via the vehicle communication network 120 to the first vehicle 104, a distance between the first vehicle 104 and the second vehicle 108, among others.

As discussed above with FIG. 2, block 208, in some embodiments, the first vehicle 106 and/or the second vehicle 108 can determine a transmission interval. A transmission interval, as used within this description, is a period of time between transmission and/or communication of sensor data from the sensor unit 126 to the second vehicle 108, and from the sensor unit 154 to the first vehicle 106. In other embodiments, the transmission interval can be a period of time from transmission of a sensor trigger pulse that actuates the sensor unit 126 and a period of time from transmission of a sensor trigger pulse that actuates the sensor unit 154. Said differently, in this embodiment, the transmission interval can be a period of time from when the sensor data is captured at the first vehicle 106 and/or at the second vehicle 108. For example, as shown in FIG. 5A, the first vehicle 106 captures frame 1 at 0 ms and transmits the results of frame 1 (e.g., after processing of frame 1) at 100 ms to the second vehicle 108. Similarly, the second vehicle 108 captures frame 1 at 0 ms and transmits the results of frame 1 (e.g., after processing of frame 1) at 100 ms to the first vehicle 106. In this embodiment, the transmission interval for the first vehicle 106 and the second vehicle 108 is 100 ms. Thus, the transmission interval can be substantially the same for the first vehicle 106 and the second vehicle 108. In some embodiments, the transmission interval is based on the capture interval and a sensor data acquisition process time. Further, in some embodiments, the transmission interval is equal to the capture interval. Accordingly, in addition to synchronizing the timing of data capture, the timing of transmission of sensor data can also be synchronized between the first vehicle 106 and the second vehicle 108.

Figure 5B:
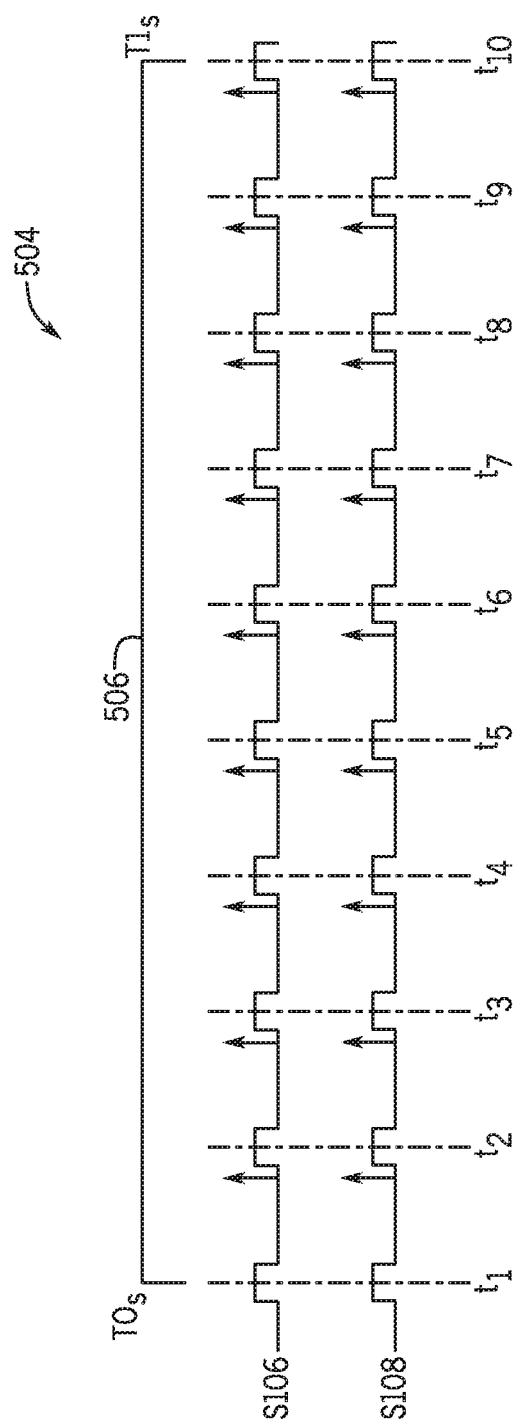
FIG. 5B is a schematic timing diagram of the minimum synchronization and processing of sensor data of FIG. 5A according to an exemplary embodiment.

Referring again to FIG. 4, at block 410, the method 400 includes actuating, according to the capture interval, the sensor unit 126 of the first vehicle 106 to capture sensor data from the sensor unit 126 of the first vehicle 106 and actuating the sensor unit 154 of the second vehicle 108 to capture sensor data from the sensor unit 154 of the second vehicle 108. According to the capture interval, and as discussed above with block 402, actuation of the sensor unit 126 of the first vehicle 106 and the sensor unit 154 of the second vehicle 108 is executed so that the sensor data from the sensor unit 126 and the sensor data from the sensor unit 154 are captured at substantially the same time. For example, as shown in FIG. 5B, the sensor unit 126 of the first vehicle 106 and the sensor unit 154 of the second vehicle 108 are activated and capture sensor data at times: $t_1$, $t_2$, $t_3$, $t_4$, $t_5$, $t_6$, $t_7$, $t_8$, $t_9$, and $t_{10}$.

Further, at block 412, the method 400 includes, sharing the sensor data between the first vehicle 106 and the second vehicle 108. More specifically, the first vehicle 106 transmits to the second vehicle 108 the sensor data from the sensor unit 126 of the first vehicle 106 acquired by the actuation of the sensor unit 126 of the first vehicle 106 (e.g., at block 404), and the second vehicle 108 transmits to the first vehicle 106 the sensor data from the sensor unit 154 of the second vehicle 108 by the actuation of the sensor unit 154 of the second vehicle 108 (e.g., at block 404). In this embodiment, the transmission of data is executed at substantially the same time. For example, as shown in FIG. 5A, the first vehicle 106 Transmit Results "Frame 1" at substantially the same time (i.e., 100 ms) as the second vehicle 108 Transmit Results "Frame 1." This is also shown in FIG. 5B, where upward pointing arrows illustrate times at which the second vehicle 108 transmits the sensor data captured by the sensor unit 154 of the second vehicle 108 to the first vehicle 106, and. As discussed above, in some embodiments, sharing the sensor data between the first vehicle 106 and the second vehicle 108 can be executed according to a transmission interval. By exchanging sensor data, the first vehicle 104 and the second vehicle 108 have realized a data frame rate greater than the data frame rate each vehicle is capable of achieving alone.

Further, at block 416 the method 400 includes, controlling the vehicle systems based, in part, on the sensor data shared between the vehicles. As discussed above in detail with FIG. 2, the processor 134 controls one or more vehicle systems 124 of the first vehicle 104 based on the sensor data from the sensor unit 126 of the first vehicle 104 and the sensor data from the sensor unit 154 of the second vehicle 108. In one embodiment, which will now be discussed in greater detail, controlling the vehicle systems 124 includes localizing positions of the first vehicle 106 and/or the second vehicle 108.

IV. Time Synchronized Vehicle Sensor Data Acquisition Processing For Localization In one embodiment, time synchronization of data acquisition processing as described above can be used to improve localization techniques. Accurate localization techniques are particularly helpful in urban areas or other areas where satellite positioning (e.g., GPS systems) performs poorly. For example, position data from GPS systems can have large errors and variances. Further, because GPS systems require an unobstructed view to satellites, inclement weather, urban regions, mountainous terrain, among others, pose challenges to vehicle localization. Co-operative localization using vehicular communication using the systems and methods described above can help vehicles determine their own positions and the positions of other vehicles more accurately.

Figure 6A:
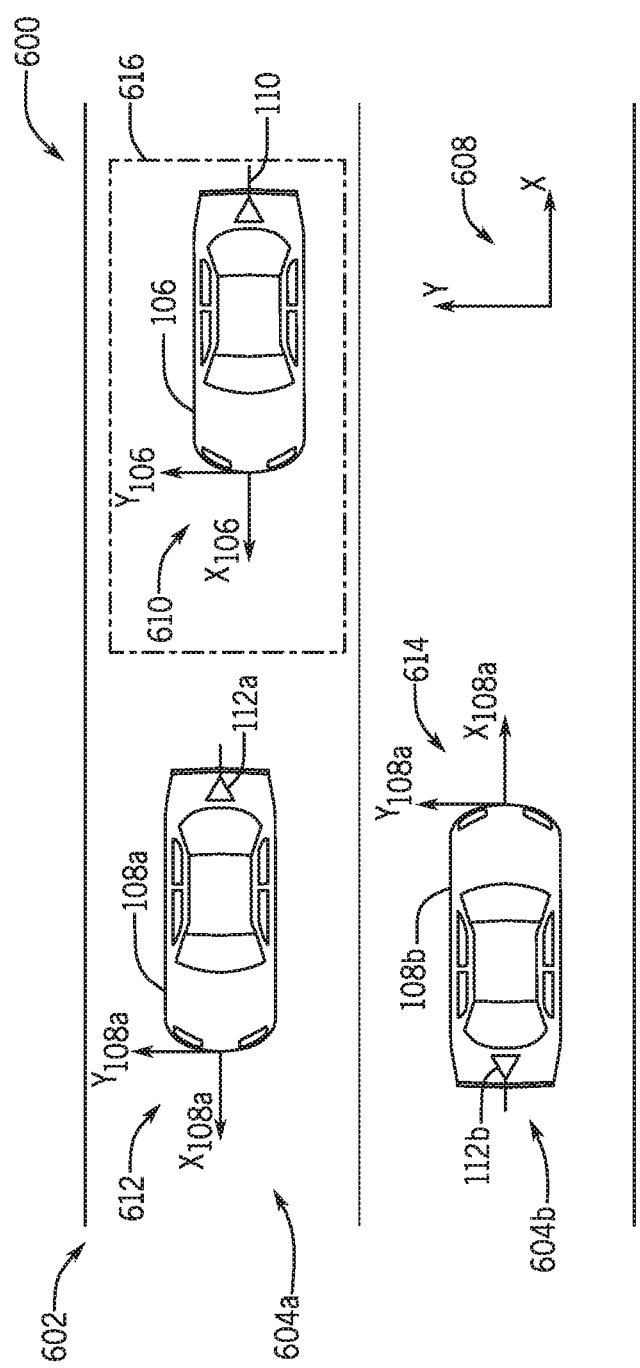
FIG. 6A is a schematic view of an exemplary traffic scenario implementing synchronized vehicle sensor data acquisition processing for localization according to one embodiment.

An illustrative example of co-operative localization using time synchronized vehicle sensor data acquisition is shown in FIG. 6A. For simplicity, like numerals and like named elements in FIG. 6A are similar to like-numbered and like-named elements described in FIGS. 1A and 1B. Additionally, it is understood that although not shown, FIG. 6A can include one or more components shown in FIGS. 1A and 1B. A traffic scenario 600 includes a first vehicle 106 and other vehicles, namely, a second vehicle 108a travelling in the same lane (i.e., the lane 604b) and ahead of the first vehicle 106, and a third vehicle 108b travelling in an adjacent lane (i.e., the lane 604c) and in an opposite flow of traffic of the lane 604b (i.e., in a direction towards the first vehicle 106). Each of the vehicles shown in FIG. 6 are operable for V2V computer communication with each other using DSRC via V2V transceivers 110, 112a, and 112b. Similar to the vehicles described with FIGS. 1A and 1B, each vehicle shown in FIG. 6 can "see" or observe other vehicles on the roadway utilizing respective sensors. For example, the first vehicle 106 can include sensors that detect a position and/or a distance to the second vehicle 108a and/or the third vehicle 108b. The second vehicle 108a can include sensors that detect a position and/or a distance to the first vehicle 106 and/or the third vehicle 108b. Similarly, the third vehicle 18b can include sensors that detect a position and/or a distance to the first vehicle 106 and/or the second vehicle 108a. Additionally, using V2V communication, each vehicle can share position information about itself and/or other vehicles.

Each vehicle can be defined in space in an absolute position (i.e., global reference frame) and a relative position (i.e., local reference frame). In FIG. 6A, the first vehicle 106 has an absolute position defined by a global reference frame 608 that is earth-fixed ($X_n$, $Y_n$). The position determination unit 140 can determine the absolute position of the first vehicle 106 based on information from the global positioning source 141 and/or based on information (e.g., wheel speed, acceleration) from an inertial measurement unit or one or more of the vehicle systems 124. The first vehicle 106 also has a relative position defined by its own coordinate frame, namely, a first vehicle coordinate frame 610 ($X_{106}$, $Y_{106}$). When the first vehicle 106 detects the second vehicle 108a and/or the third vehicle 108b, the first vehicle 106 can determine relative positions of the second vehicle 108a and/or the third vehicle 108b relative to the first vehicle 106 in the first vehicle coordinate frame 610. Similarly, the second vehicle has a second vehicle coordinate frame 612 ($X_{108a}$, $Y_{108a}$), and the third vehicle has a third vehicle coordinate frame 614 ($X_{108b}$, $Y_{108b}$). It is understood that although the local reference frame of each vehicle in FIG. 6A is determined with respect to a center point at the front of each vehicle, in other embodiments, the local reference frame can be initialized at different locations. Accordingly, each vehicle can estimate its own position using its own absolute position according to the global reference frame 608 and/or its relative positions with other vehicles according to its own coordinate frame. By exchanging local position data and relative position data using the time synchronization methods discussed above, each vehicle can update its own position estimate to self-localize itself and localize other vehicles and/or targets.

For example, the first vehicle 106 can determine an estimate of its own position. In FIG. 6A, the first vehicle 106 determines an estimate of its own position as within a target area 616. As will be discussed herein, the first vehicle 106 exchanges position data with the second vehicle 108a via DSRC. Based on the relative position data from the second vehicle 108a, the first vehicle 106 can refine the estimate of its own position. For example, based on the relative position data from the second vehicle 108a, the first vehicle 106 may determine a refined position estimate within a reduced area (not shown) of the target area 616. This position estimate and target area 616 can be further refined with relative position data from the third vehicle 108b. In some embodiments, which will be discussed herein, the first vehicle 106 can also confirm and/or compare position data from other vehicles and selectively choose which position data to use in order to refine its own position estimate.

Accordingly, localization can be improved by sharing local position data and relative position data among a plurality of vehicles. The capture and transmission of said data can be synchronized according to a common time base, as discussed above, to further improve localization. For example, in the embodiments described above with respect to FIGS. 4, 5A, and 5B, each vehicle actuates sensors at substantially the same time. However, the sensor data from each vehicle differs because each vehicle obtains sensor data at substantially the same time from different perspectives based on the position and/or orientation of each vehicle. For example, as discussed above with FIG. 6A, the first vehicle 106 can obtain position data about the second vehicle 108a and/or the third vehicle 108b according to its own relative reference frame 610. The second vehicle 108a can obtain position data about the first vehicle 106 and/or the third vehicle 108b according to its own relative reference frame 612, and so on. Sensor data, including position data, taken at substantially the same time, but from different perspectives, can provide useful information for localization. The examples discussed herein with respect to localization refer to time synchronization of data acquisition processing according to FIGS. 4, 5A, and 5B (i.e., minimum time synchronized vehicle sensor data acquisition processing). However, it is understood that in other embodiments, time synchronization of data acquisition processing according to other embodiments discussed herein (e.g., maximum time synchronized vehicle sensor data acquisition processing) can be implemented.

Figure 6B:
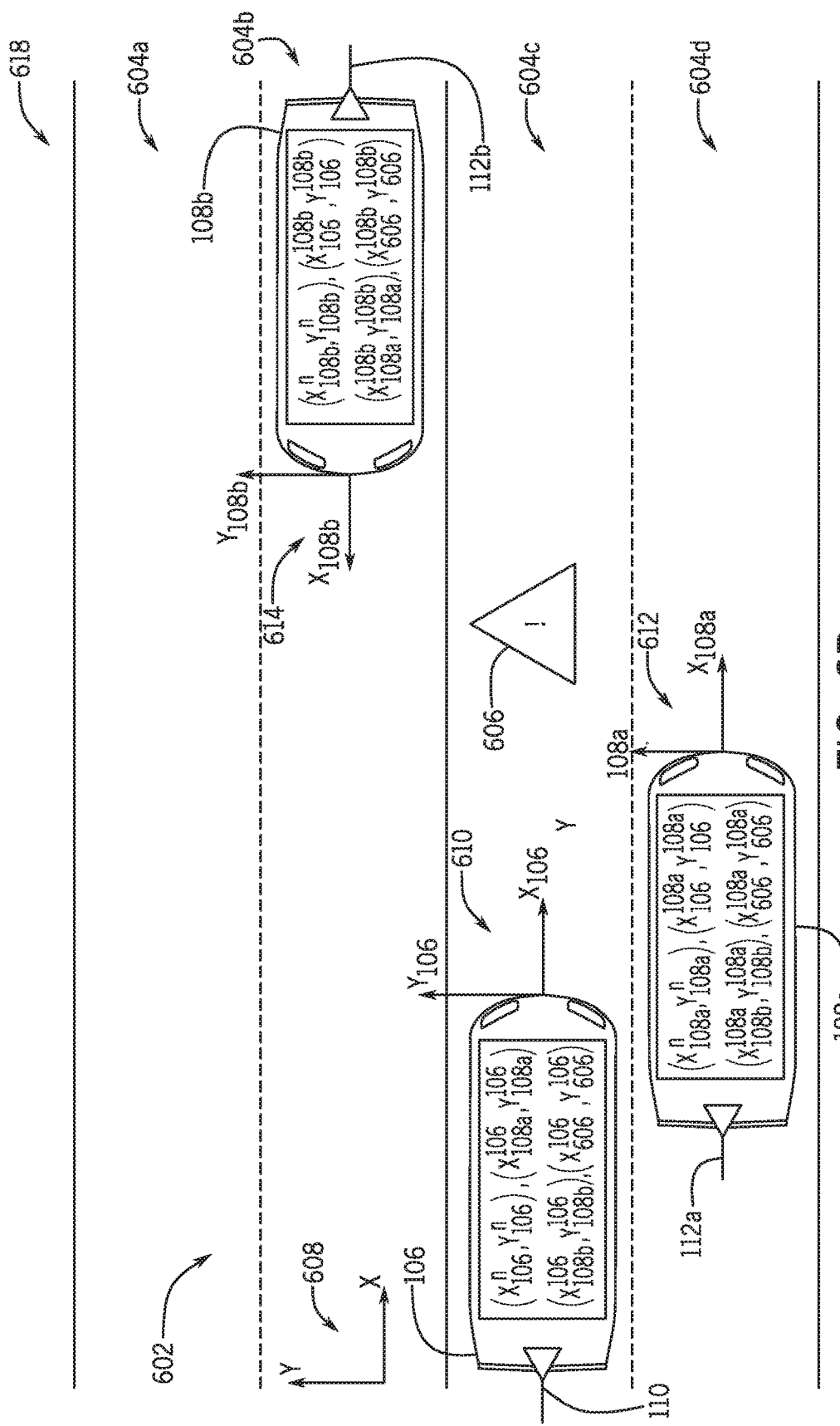
FIG. 6B is a schematic view of an exemplary traffic scenario including a target and implementing synchronized vehicle sensor data acquisition processing for localization according to one embodiment.

Localization will now be discussed in more detail with reference to FIG. 6B. FIG. 6B is exemplary traffic scenario 618 for localization using synchronized vehicle sensor data acquisition according to an exemplary embodiment, similar to FIG. 6A, but including a target 606. For simplicity, like numerals and like named elements in FIGS. 6A and 6B are similar to like-numbered and like-named elements described in FIGS. 1A and 1B. Additionally, it is understood that although not shown, FIG. 6B can include one or more components shown in FIGS. 1A, 1B, and 6A. In FIG. 6B, a first vehicle 106 and other vehicles, namely, a second vehicle 108a and a third vehicle 108b, are approaching a target 606.

Each of the vehicles shown in FIG. 6B are operable for V2V computer communication with each other using DSRC via V2V transceivers 110, 112a, and 112b. Similar to the vehicles described with FIGS. 1A, 1B, and 6A, each vehicle shown in FIG. 6B can "see" or observe the target 606 utilizing respective sensors. In some embodiments, the respective sensors can also observe other vehicles on the roadway 602. For example, the first vehicle 106 can include sensors that detect a position and/or a distance to the second vehicle 108a and/or the third vehicle 108b. The second vehicle 108a can include sensors that detect a position and/or a distance to the first vehicle 106 and/or the third vehicle 108b. Similarly, the third vehicle 18b can include sensors that detect a position and/or a distance to the first vehicle 106 and/or the second vehicle 108a. Additionally, using V2V communication, each vehicle can share position information about itself and/or other vehicles.

Each vehicle can be defined in space in an absolute position (i.e., global reference frame) and a relative position (i.e., local reference frame). In FIG. 6B, the first vehicle 106 has an absolute position defined by a global reference frame 608 that is earth-fixed ($X_n$, $Y_n$). The position determination unit 140 can determine the absolute position of the first vehicle 106 based on information from the global positioning source 141 and/or based on information (e.g., wheel speed, acceleration) from an inertial measurement unit or one or more of the vehicle systems 124. The first vehicle 106 also has a relative position defined by its own coordinate frame, namely, a first vehicle coordinate frame 610 ($X_{106}$, $Y_{106}$). When the first vehicle 106 detects the second vehicle 108a, the third vehicle 108b, and/or the target 606, the first vehicle 106 can determine relative positions of the second vehicle 108a, the third vehicle 108b, and/or the target 606 relative to the first vehicle 106 in the first vehicle coordinate frame 610. Similarly, the second vehicle has a second vehicle coordinate frame 612 ($X_{108a}$, $Y_{108a}$), and the third vehicle has a third vehicle coordinate frame 614 ($X_{108b}$, $Y_{108b}$). It is understood that although the local reference frame of each vehicle in FIG. 6B is determined with respect to a center point at the front of each vehicle, in other embodiments, the local reference frame can be initialized at different locations. Accordingly, each vehicle can estimate its own position using its own absolute position according to the global reference frame 608 and/or its relative positions with other vehicles according to its own coordinate frame. By exchanging local position data and relative position data using the time synchronization methods discussed above, each vehicle can update its own position estimate to self-localize itself and localize other vehicles and/or targets.

Figure 7:
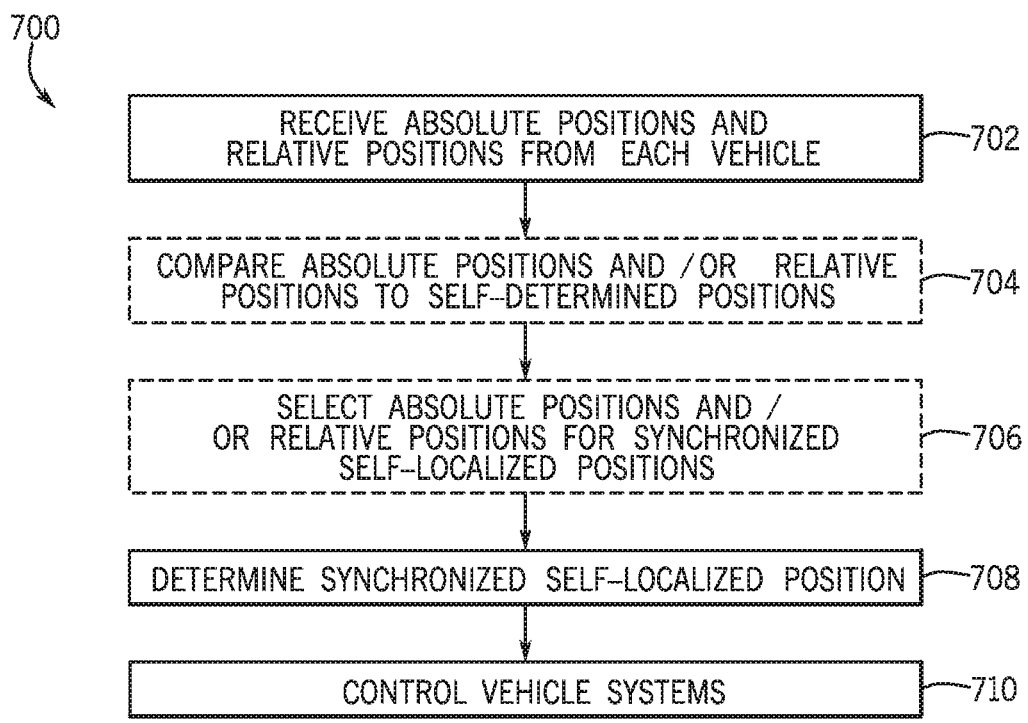
FIG. 7 is a process flow diagram of a method for synchronized vehicle sensor data acquisition processing for localization according to an exemplary embodiment.

With reference to FIG. 7, a method 700 for localization using synchronized vehicle sensor data acquisition will be described. It is understood that in some embodiments, one or more of the components of the method 700 can be omitted, reorganized, and/or integrated with the methods 200 and 400 discussed herein. For simplicity, the method 700 will be described with reference to the method 400. Accordingly, at block 702, the method 700 can include receiving a geoposition (e.g., a global position) of each vehicle and/or a relative position of each vehicle. In some embodiments, a geoposition of each vehicle may not be available, for example, because access to the global positioning source 141 is obstructed. With reference to block 406 of FIG. 4, sharing sensor data by transmitting sensor data acquired by actuation of each sensor at substantially the same time (e.g., at block 404), can include sharing a global position of the transmitting vehicle, a relative position of the receiving vehicle, a relative position of a target, and/or a relative position of each of the other vehicles sharing sensor data.

Thus, in one embodiment, the first vehicle 106 transmits first vehicle position data to the second vehicle 108a, the first vehicle position data including a geoposition of the first vehicle 106 ($X''_{106}$, $Y''_{106}$) and a relative position of the second vehicle 108a ($X^{106}_{108a}$, $Y^{106}_{108a}$) based on the sensor data from the sensor unit 126 of the first vehicle 106. In some embodiments, the first vehicle 106 can also transmit a relative position of the target 606 ($X^{106}_{606}$, $Y^{106}_{606}$), and a relative position of the third vehicle 108b ($X^{106}_{108b}$, $Y^{106}_{108b}$). Further, the second vehicle 108a transmits second vehicle position data to the first vehicle 106, the second vehicle 108a position data including a geoposition of the second vehicle 108a ($X''_{108a}$, $Y''_{108a}$) and a relative position of the first vehicle 106 ($X^{108a}_{106}$, $Y^{108a}_{106}$) with the sensor data from the sensor unit 154 of the second vehicle 108a. In some embodiments, the second vehicle 108a can also transmit a relative position of the target 606 ($X^{108a}_{604}$, $Y^{108a}_{604}$) and a relative position of the third vehicle 108b ($X^{108a}_{108b}$, $Y^{108a}_{108b}$). Similarly, the third vehicle 108b can transmit a geoposition of the third vehicle 108b ($X''_{108b}$, $Y''_{108b}$), a relative position of the first vehicle 106 ($X^{108b}_{106}$, $Y^{108b}_{106}$), a relative position of the second vehicle 108a ($X^{108b}_{108a}$, $Y^{108b}_{108a}$), and a relative position of the target 606 ($X^{108b}_{604}$, $Y^{108b}_{604}$) to the first vehicle 106 and/or the second vehicle 108a.

Using the shared position information, each vehicle can perform localization of itself, other vehicles, and/or the target 606 at block 708. More specifically, at block 704, the method 700 can optionally include comparing self-determined positions to received relative positions and/or received geopositions. For example, the first vehicle 106 can compare its self-geoposition, the geoposition (i.e., absolute position) of the first vehicle 106 ($X''_{106}$, $Y''_{106}$), with the relative position of the first vehicle 106 ($X^{108a}_{106}$, $Y^{108a}_{106}$) as seen from the second vehicle 108a, the relative position of the first vehicle 106 ($X^{108b}_{106}$, $Y^{108b}_{106}$) as seen from the third vehicle 108b, the geoposition of the second vehicle 108a ($X''_{108a}$, $Y''_{108a}$) transmitted by the second vehicle 108a, and/or the geoposition of the third vehicle 108b ($X''_{108b}$, $Y''_{108b}$) transmitted by the third vehicle 108b. In some embodiments, the first vehicle 106 can compare its self-geoposition and/or a relative position of the target 606 as seen from its self ($X^{106}_{606}$, $Y^{106}_{606}$), with the relative positions of the target 606 as seen from and transmitted by the second vehicle 108a ($X^{108a}_{606}$, $Y^{108a}_{606}$), and the third vehicle 108b ($X^{108b}_{606}$, $Y^{108b}_{606}$). Based on these comparisons, the first vehicle 106 can determine a self-localized position of the first vehicle 106, a localized position of the second vehicle 108a, a localized position of the third vehicle 108b, and/or a localized position of the target 606, at block 708. The determination and/or calculation of these localized positions can be performed using triangulation, trilateration, dead reckoning, among others.

In one embodiment, at block 706, the relative positions used for comparison at block 704 or used to calculate the localized positions at block 708, can be selected from the relative positions received from the other vehicles. For example, when each data frame of sensor data is received (e.g., at block 406), the first vehicle 106 can identify relative positions from the relative positions transmitted by the second vehicle 108a and/or the third vehicle 108b, for use in the localization determination at block 708. For example, the first vehicle 106 can identify relative positions based on a tolerance level. In other embodiments, the first vehicle 106 can assign a confidence level to each relative position for use in the localization determination at block 708. In this embodiment, the confidence level can be based on a distance between the first vehicle 106 and the vehicle the relative position is received from. In other embodiments, the confidence level can be based on an error threshold from the absolute position of the first vehicle 106 and/or a relative position of the first vehicle 106 determined by the first vehicle 106.

Further, at block 710, the method 700 includes, controlling the vehicle systems based, in part, on the self-localized positions determined at block 708. For example, the position determination unit 140 can use the self-localized positions for navigation purposes. In other embodiments, advanced driver assistance systems can use the self-localized positions for anti-collision purposes. Based on the above method and system, position data from multiple vehicles where the sensors are actuated at substantially the same time from a common global time reference, can be fused to provide accurate localization.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling vehicle sensor data acquisition using a vehicular communication network, comprising:

establishing an operable connection for computer communication between a first vehicle and a second vehicle using the vehicular communication network;

receiving a global time signal at the first vehicle and at the second vehicle, wherein a processor of the first vehicle synchronizes a local clock signal of the first vehicle with the global time signal, and a processor of the second vehicle synchronizes a local clock signal of the second vehicle with the global time signal;

determining a capture interval for a sensor data acquisition process time that maximizes a total number of data frames that can be captured by a sensor of the first vehicle and by a sensor of the second vehicle that is based on a number of vehicles within a predetermined distance from the first vehicle;

transmitting a first sensor trigger pulse according to the capture interval to the sensor of the first vehicle thereby triggering acquisition of sensor data from the sensor of the first vehicle, wherein the first vehicle transmits the sensor data from the sensor of the first vehicle to the second vehicle; and transmitting a second sensor trigger pulse according to the capture interval to the sensor of the second vehicle thereby triggering acquisition of sensor data from the sensor of the second vehicle, wherein the second sensor trigger pulse is offset from the first sensor trigger pulse by the capture interval, and wherein the second vehicle transmits the sensor data from the sensor of the second vehicle to the first vehicle.

2. The computer-implemented method of claim 1, wherein transmitting the second sensor trigger pulse includes transmitting the second sensor trigger pulse at a time offset by the capture interval from the first sensor trigger pulse by the capture interval, thereby triggering acquisition of the sensor data from the sensor of the second vehicle at a time offset by the capture interval from the acquisition of the sensor data from the sensor of the first vehicle.

3. The computer-implemented method of claim 1, further including transmitting a message from the first vehicle to the second vehicle, the message including the capture interval.

4. The computer-implemented method of claim 1, further including transmitting a message from the first vehicle to the second vehicle, the message including the capture interval and a start time for data acquisition of the sensor data from the sensor of the second vehicle.

5. The computer-implemented method of claim 3, wherein the start time for data acquisition of the sensor data from the sensor of the second vehicle is offset by the capture interval from a start time for data acquisition of the sensor data from the sensor of the first vehicle.

6. The computer-implemented method of claim 1, further including upon detecting a trigger event by the first vehicle, establishing the operable connection for computer communication between the first vehicle and the second vehicle using the vehicular communication network.

7. The computer-implemented method of claim 1, wherein determining the capture interval for the sensor data acquisition process time that maximizes the total number of data frames is based on a distance between the first vehicle and the second vehicle.

8. A system for controlling vehicle sensor data acquisition using a vehicular communication network, comprising:
    a first vehicle configured for computer communication with a second vehicle using the vehicular communication network; and
    a processor that receives a global time signal from a global positioning source and synchronizes a local clock signal of the first vehicle with the global time signal;
    the processor determines a capture interval that maximizes a total number of data frames for capture by a sensor of the first vehicle based on a sensor of the second vehicle and a number of vehicles within a predetermined distance from the first vehicle;
    the processor transmits a first sensor trigger pulse according to the capture interval to the sensor of the first vehicle thereby triggering acquisition of sensor data from the sensor of the first vehicle, wherein the sensor of the first vehicle transmits the sensor data from the sensor of the first vehicle to the second vehicle; and
    the processor transmits a second sensor trigger pulse according to the capture interval to the sensor of the second vehicle thereby triggering acquisition of sensor data from the sensor of the second vehicle, wherein the sensor of the second vehicle transmits the sensor data from the sensor of the second vehicle to the first vehicle.

9. The system of claim 8, wherein a local clock signal of the second vehicle is synchronized with the global positioning source.

10. The system of claim 8, wherein the processor transmits the second sensor trigger pulse at a time offset by the capture interval from a time the first sensor trigger pulse is transmitted.

11. The system of claim 8, wherein upon the processor detecting a trigger event, the first vehicle and the second vehicle establish an operable connection for computer communication using the vehicular communication network.

12. The system of claim 8, wherein the processor determines a distance between the first vehicle and the second vehicle, and wherein the processor determines the
    the capture interval based on a distance between the first vehicle and the second vehicle.

13. The system of claim 8, wherein the processor controls one or more vehicle systems of the first vehicle based on the sensor data from the sensor of the first vehicle and the sensor data from the sensor of the second vehicle.

14. The system of claim 8, wherein the processor sets a start time for data acquisition of the sensor data from the sensor of the second vehicle, wherein the start time for data acquisition of the sensor data from the sensor of the second vehicle is offset by the capture interval from a start time for data acquisition of the sensor data from the sensor of the first vehicle.

15. A non-transitory computer-readable storage medium including instructions that when executed by a processor, cause the processor to:
    establish an operable connection for computer communication between a first vehicle and a second vehicle;
    acquire a global time signal from a global position source;
    synchronize a local clock signal of the first vehicle with the global time signal, and synchronize a local clock signal of the second vehicle with the global time signal;
    determining a capture interval that maximizes a total number of data frames for capture by a sensor of the first vehicle and by a sensor of the second vehicle that is based on a number of vehicles within a predetermined distance from the first vehicle;
    generate a first sensor trigger pulse according to the capture interval to the sensor of the first vehicle thereby triggering acquisition of sensor data from the sensor of the first vehicle, and transmit the sensor data from the sensor of the first vehicle to the second vehicle; and
    generate a second sensor trigger pulse according to the capture interval to the sensor of the second vehicle thereby triggering acquisition of sensor data from the sensor of the second vehicle, wherein the second sensor trigger pulse is offset from the first sensor trigger pulse by the capture interval, and receive the sensor data from the sensor of the second vehicle at the first vehicle.

16. The non-transitory computer-readable storage medium of claim 15, further including controlling one or more vehicle systems of the first vehicle based on the sensor data from the sensor of the first vehicle and the sensor data from the sensor of the second vehicle.

17. The non-transitory computer-readable storage medium of claim 15, further including transmitting a message from the first vehicle to the second vehicle, the message including the capture interval.

18. The non-transitory computer-readable storage medium of claim 15, wherein transmitting the second sensor trigger pulse includes transmitting the second sensor trigger pulse at a time offset by the capture interval from the first sensor trigger pulse by the capture interval, thereby triggering acquisition of the sensor data from the sensor of the second vehicle at a time offset by the capture interval from the acquisition of the sensor data from the sensor of the first vehicle.

19. A computer-implemented method for controlling vehicle sensor data acquisition of a vehicle using a vehicular communication network, comprising:

establishing an operable connection for computer communication between a plurality of vehicles using the vehicular communication network, wherein each vehicle of the plurality of vehicles includes a processor, a local clock, and a sensor;

using the operable connection for computer communication, synchronizing the local clock of each vehicle of the plurality of vehicles with a global time signal from a global positioning source;

determining a capture interval for a clock cycle of the local clock of each vehicle of the plurality of vehicles, wherein the capture interval maximizes a total number of data frames for capture by the sensors of the plurality of vehicles that is based on a number of the plurality of vehicles within a predetermined distance from the vehicle;

alternately capturing, at times offset by the capture interval, sensor data from the sensors of the plurality of vehicles, wherein each vehicle of the plurality of vehicles transmits the sensor data to the other vehicles in the plurality of vehicles.

20. The computer-implemented method of claim 19, further including setting a start time for sensor data acquisition at each vehicle of the plurality of vehicles according to the local clock of each vehicle of the plurality of vehicles, wherein the start time for each vehicle is displaced from one another by the capture interval.

* * * * *